United States Patent [19]
Yorimitsu

[11] Patent Number: 5,845,319
[45] Date of Patent: Dec. 1, 1998

[54] DISK ARRAY DEVICE WHICH SEPARATES LOCAL AND PHYSICAL DISKS USING STRIPING AND OPERATION MODE SELECTION

[75] Inventor: Keiichi Yorimitsu, Kawasaki, Japan

[73] Assignee: Fujitsu Limited, Kawasaki, Japan

[21] Appl. No.: 697,251

[22] Filed: Aug. 21, 1996

[30] Foreign Application Priority Data

Aug. 23, 1995 [JP] Japan .................................. 7-215029

[51] Int. Cl.⁶ .................................................. G06F 12/00
[52] U.S. Cl. ..................... 711/114; 711/170; 395/182.04
[58] Field of Search .................................... 711/114, 170; 395/182.04

[56] References Cited

U.S. PATENT DOCUMENTS

| | | | |
|---|---|---|---|
| 5,274,645 | 12/1993 | Idleman et al. | 395/182.04 |
| 5,301,297 | 4/1994 | Menon et al. | 711/114 |
| 5,502,836 | 3/1996 | Hale et al. | 711/170 |
| 5,519,844 | 5/1996 | Stallmo | 711/114 |
| 5,592,648 | 1/1997 | Schultz et al. | 711/114 |
| 5,613,085 | 3/1997 | Lee et al. | 711/114 |

OTHER PUBLICATIONS

Ogawa et al., "F6401A Magnetic Disk Array Unit", Fujitsu Science and Technical Journal, vol. 31, No. 1, pp. 18–28 (Jun. 1995).

Matsushima et al., "F1710A File Control Unit and F6493 Array Disk Subsystem", Fujitsu Science and Technical Journal, vol. 31, No. 1, pp. 29–35 (Jun. 1995).

The RAID Advisory Board, "The RAIDBook A Source Book for RAID Technology", Edition 1–1, Nov. 18, 1993.

"Disk Array Device", Nikkei Electronics 1993, 4.26, No. 579, pp. 77–103.

*Primary Examiner*—Tod R. Swann
*Assistant Examiner*—David Lausjahr
*Attorney, Agent, or Firm*—Staas & Halsey

[57] ABSTRACT

In a disk array device, a logical device is defined by a plurality of hard disk drives, with the logical device formed by different types of hard disk drives. A logical device setting unit divides the storage area of each of the hard disk drives into parts and performs striping for the divided storage areas of the disk drives. Hence, a logical device can be defined taking into account the capacities of the hard disk drives and can be formed by using hard disk drives of different types.

21 Claims, 21 Drawing Sheets

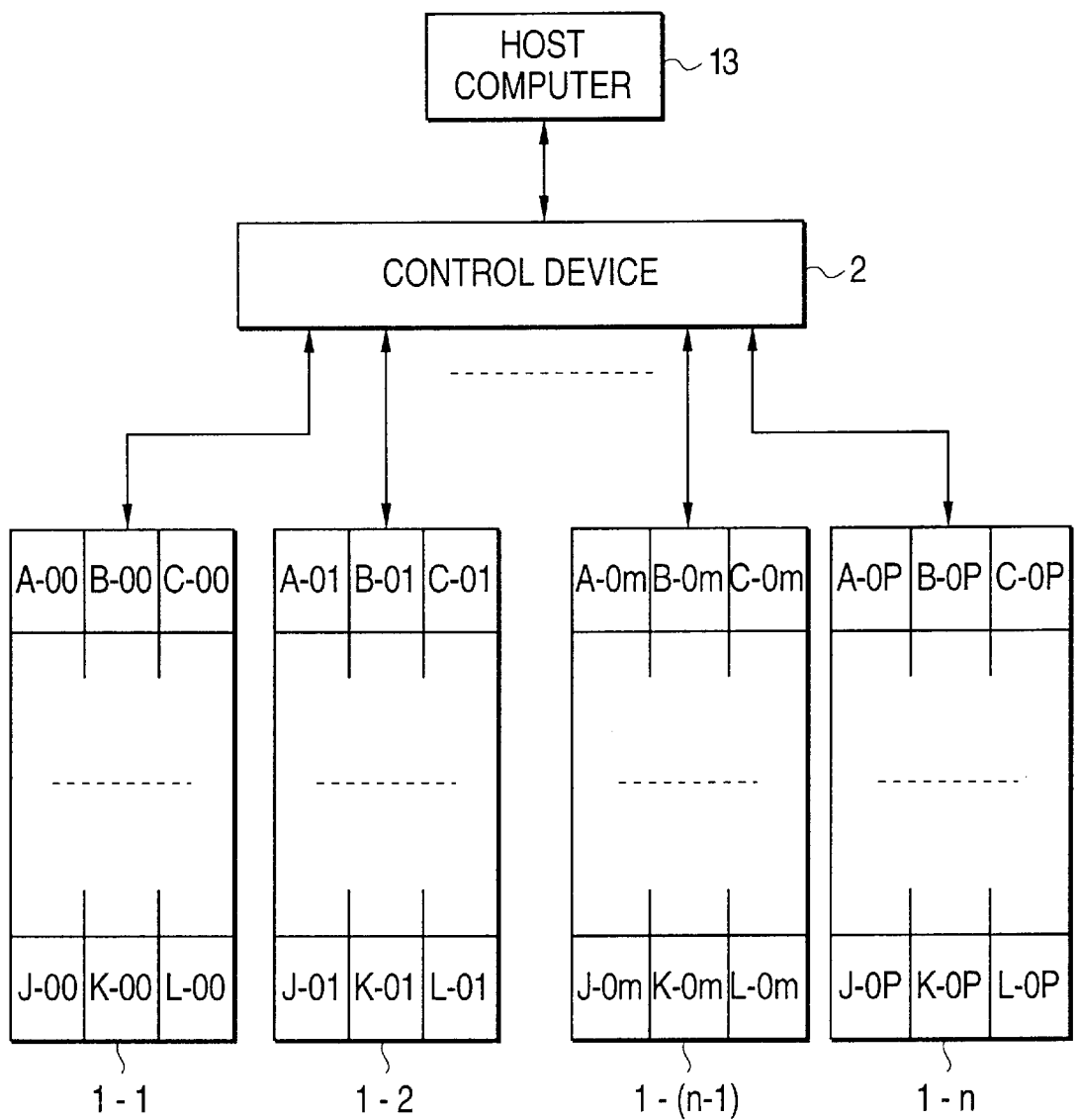

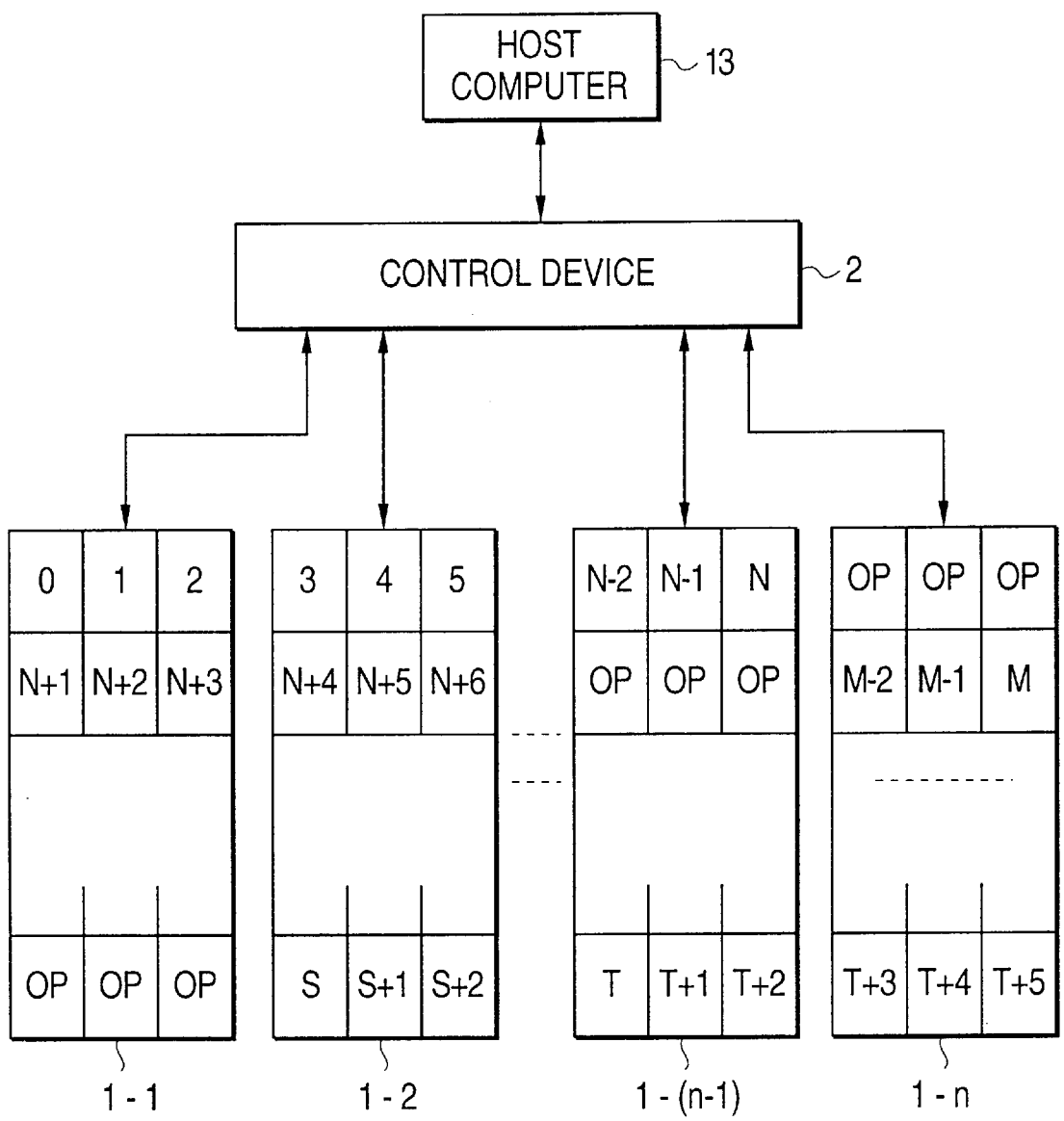

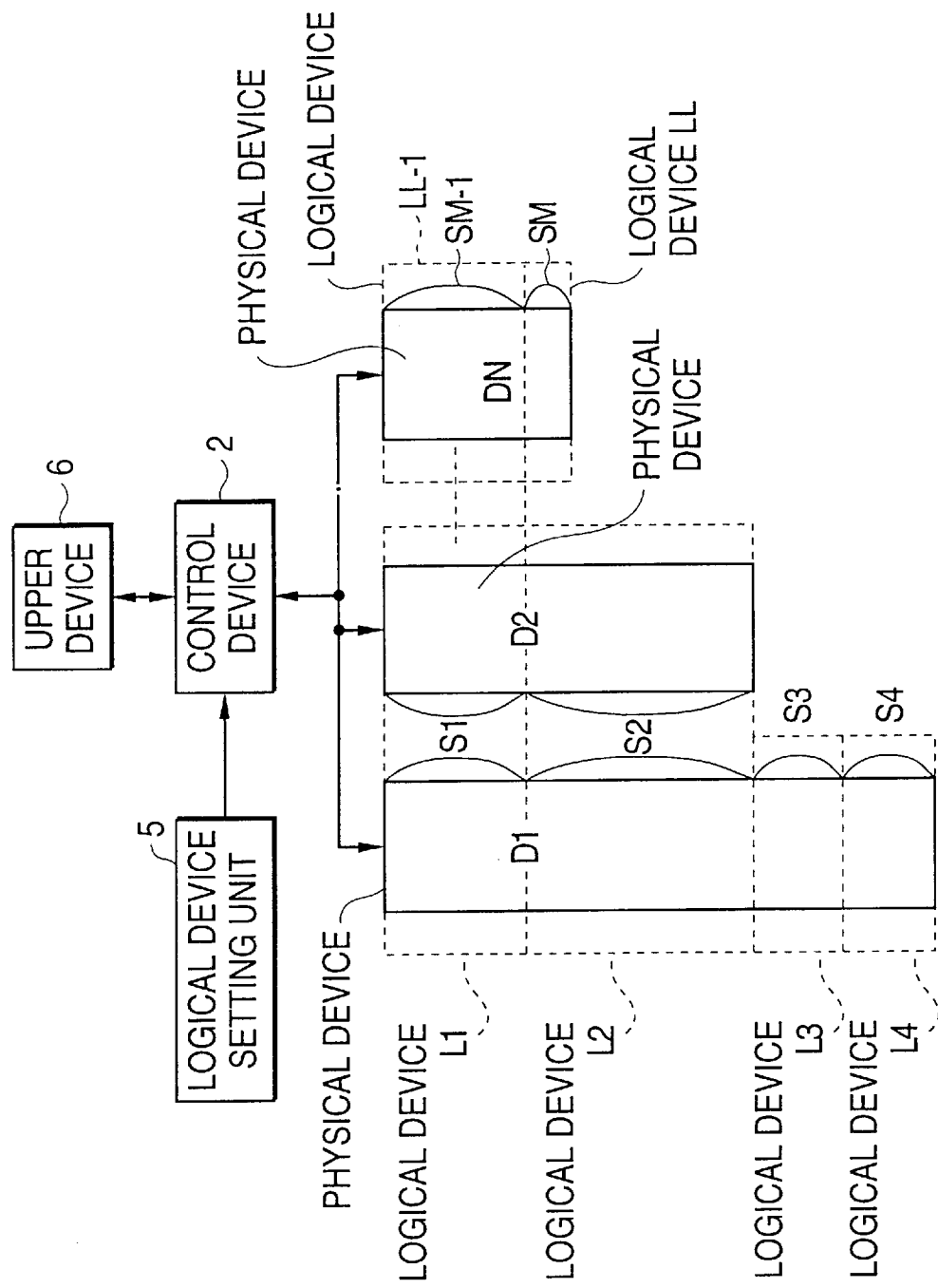

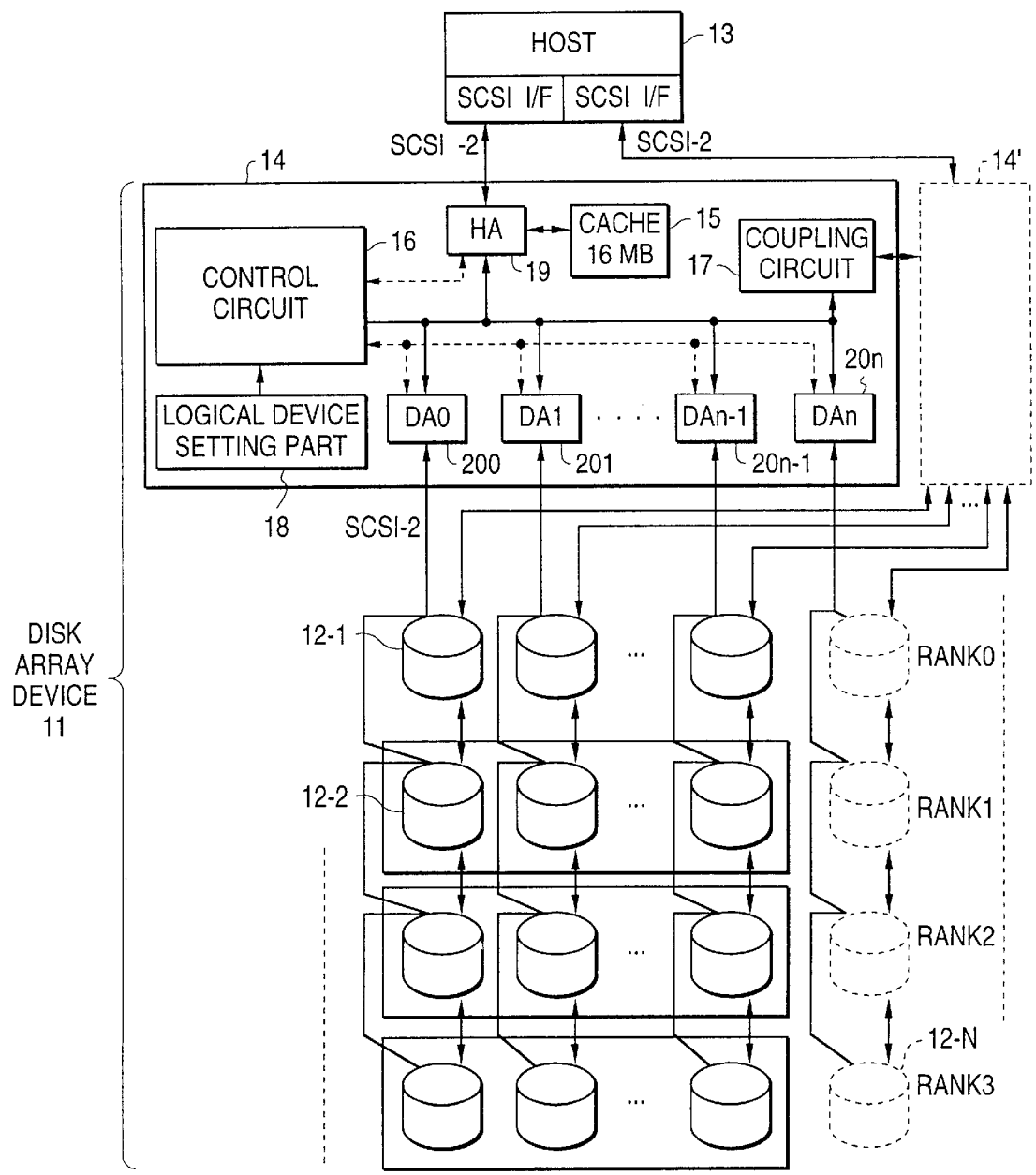

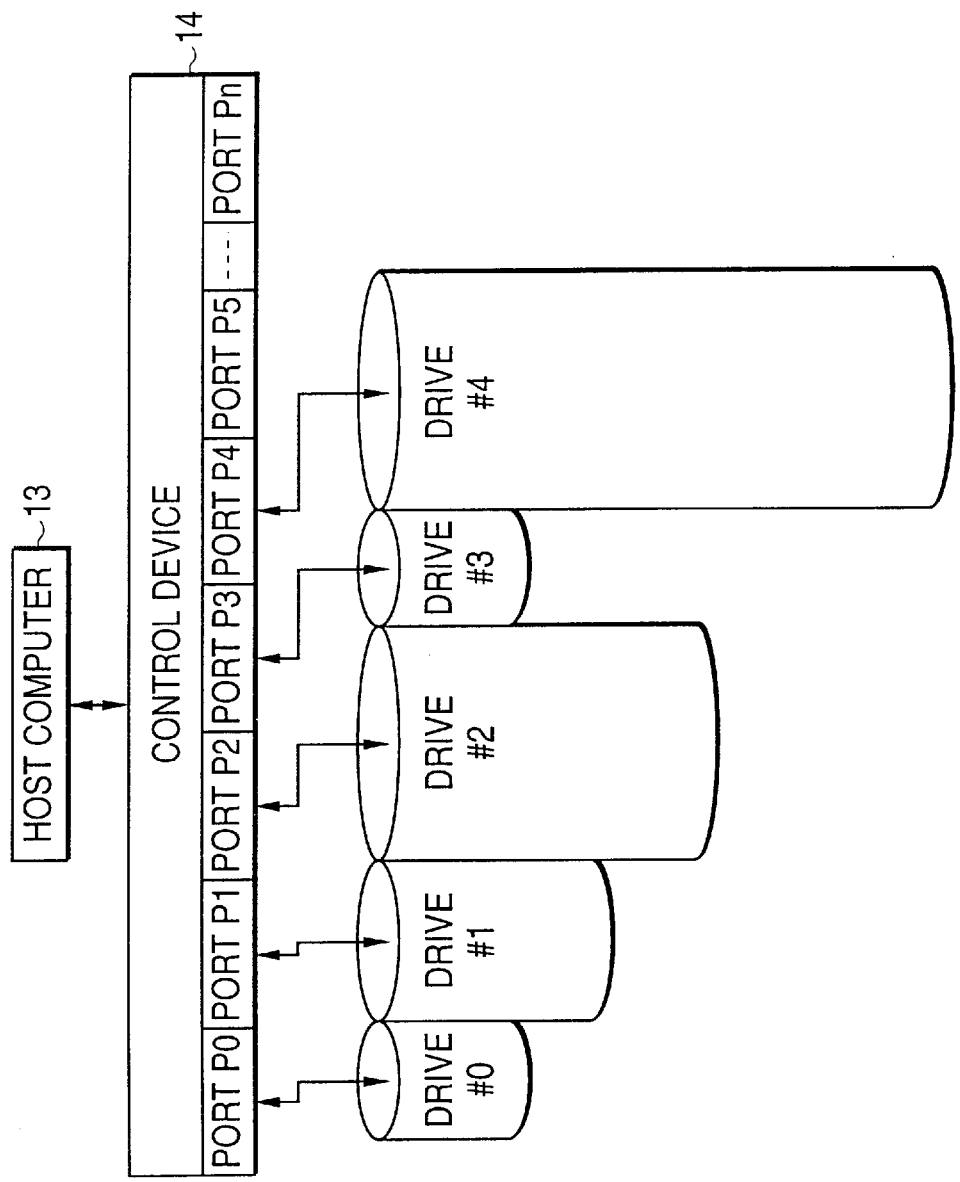

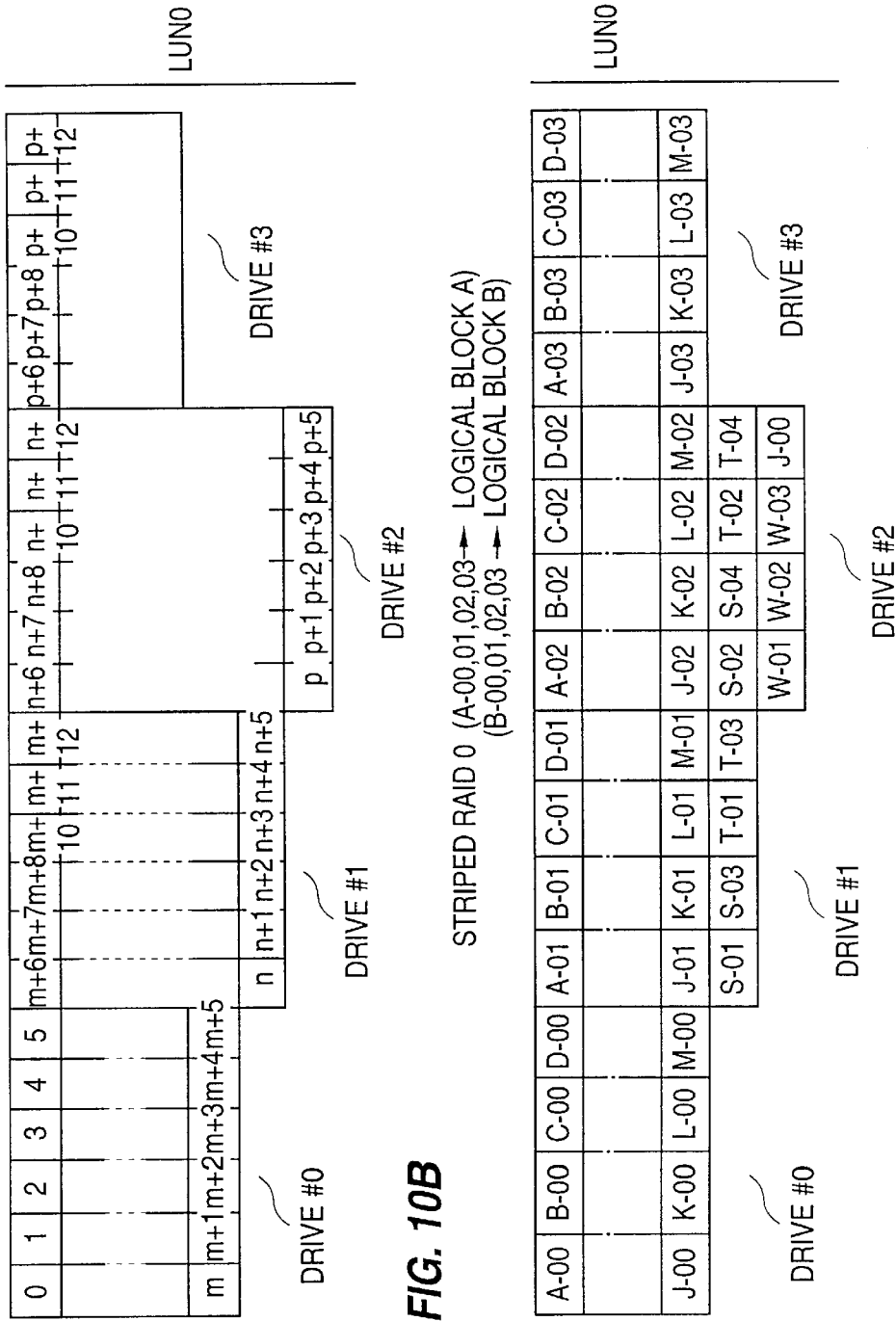

FIG. 13

STRIPING IN RAID 5 MODE (0, 1, 2, 3 → LOGIC BLOCK NUMBER)

| | | | | | | | | | | | | |
|---|---|---|---|---|---|---|---|---|---|---|---|---|
| 0 | 1 | 2 | 3 | 4 | 5 | 6 | 7 | 8 | 9 | 10 | 11 | P-2 |
| 12 | 13 | 14 | 15 | 16 | 17 | 18 | 19 | 20 | P-12 | P-13 | P-14 | 22 | 23 |
| 24 | 25 | 26 | 27 | 28 | 29 | P-24 | P-25 | P-26 | 30 | 31 | 32 | 33 | 34 | 35 |

(Drive #0: 0, 12, 24, 50, 59 ...; Drive #4 contains P-0, P-1, P-2, 21, 22, 23, 33, 34, 35 — LUN0)

| | | | | | |
|---|---|---|---|---|---|
| 50 | 51 | 52 | 53 | 54 | 55 | 56 | 57 | 58 | P-50 | P-51 | P-52 |
| 59 | 60 | 61 | 62 | 63 | 64 | P-59 | P-60 | P-61 | 65 | 66 | 67 |

LUN1

| | | | | | |
|---|---|---|---|---|---|
| | 100 | 101 | 102 | 103 | 104 | 105 | P100 | P101 | P102 |
| | | | | 200 | 201 | 202 | P200 | P201 | P202 |

LUN2
LUN3

DRIVE #0  DRIVE #1  DRIVE #2  DRIVE #3  DRIVE #4

STRIPING IN MIXED RAID MODE

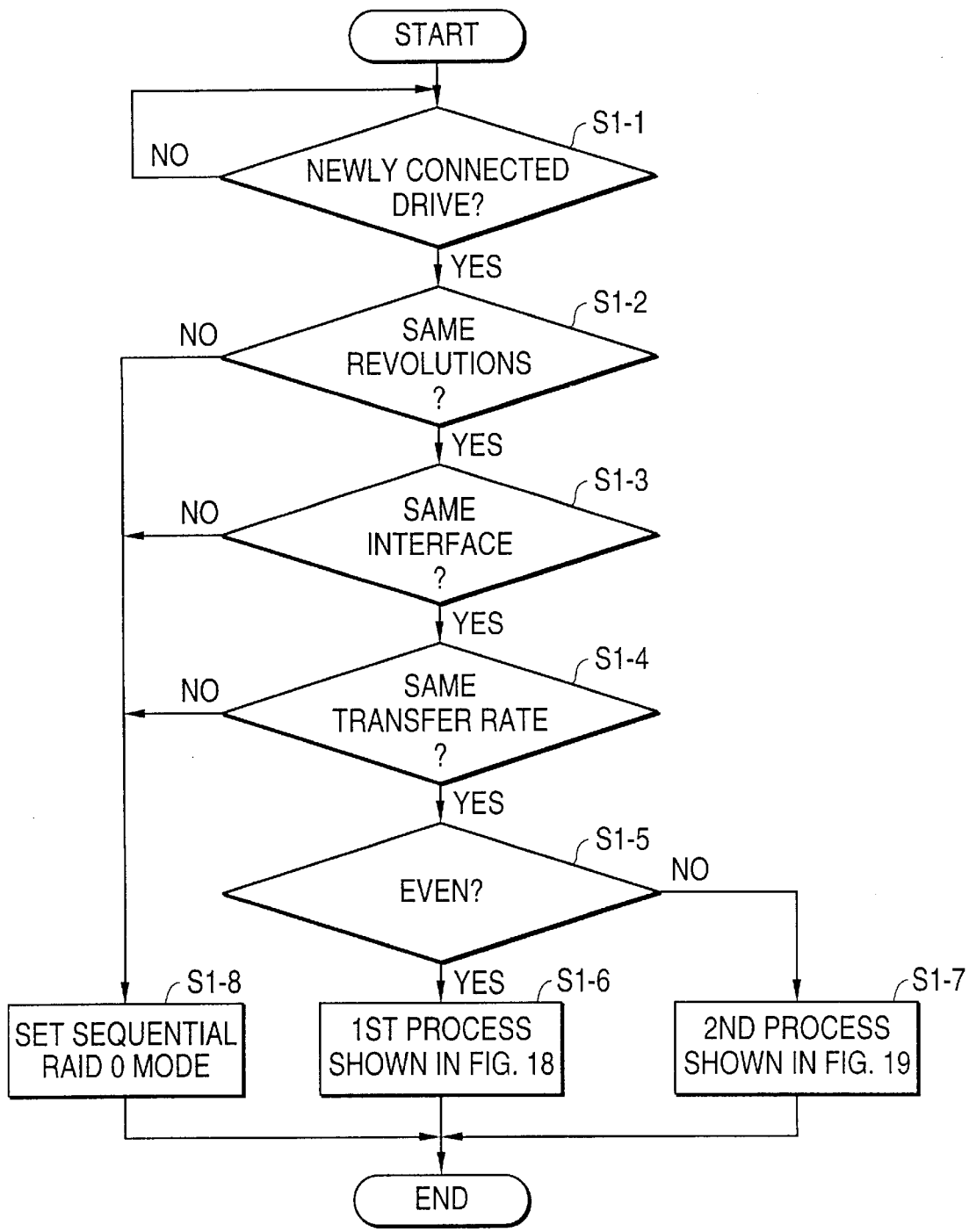

DISK ARRAY DEVICE WHICH SEPARATES LOCAL AND PHYSICAL DISKS USING STRIPING AND OPERATION MODE SELECTION

BACKGROUND OF THE INVENTION

1. Field of the Invention

The present invention relates to disk array devices, and more particularly to a disk array device in which a logical device is configured by combining a plurality of hard disk drives (physical disk drives) together.

2. Description of the Related Art

Recent trends in open architecture, including standardization of interfaces and computer size reduction, have led to an increased demand for a plurality of hard disk drives having different capacities used as a highly reliable, high performance disk array device by connecting the hard disk drives to a host computer.

FIG. 1 is a block diagram of an example of a conventional disk array device, which includes hard disk drives 1-1 through 1-n. The hard disk drives 1-1 through 1-n are identical to each other, have an identical capacity, and are each connected to a control device 2 respectively through Ports P1, . . . , Pn.

The control device 2 is connected to a host computer 13, and controls data reading and writing operations carried out between the hard disk drives 1-1 through 1-n and the host computer 13. The control device 2 handles the hard disk drives 1-1 through 1-n as a logical device 4. The scheme of handling the hard disk drives 1-1 through 1-n as a logical device is called RAID (Redundant Arrays of Inexpensive disks), and is used to configure a low-cost disk array device having redundancy.

As is well known, RAID has a plurality of operating modes, which are mainly RAID Level 0 (RAID0), RAID Level 1 (RAID 1), RAID Level 3 (RAID3), and RAID Level 5 (RAID5). Examples of RAID operating modes are presented and explained in *The RAIDBook, A Source Book for RAID Technology*, Edition 1-1, Published by The RAID Advisory Board, St. Peter, Minn., Nov. 18, 1993.

FIGS. 2 through 5 are diagrams showing the operation modes of RAID.

In RAID0, as shown in FIG. 2, serial striping is carried out for a plurality of hard disk drives without adding an error correction code such as a parity code. As shown in FIG. 2, logical blocks (0, 1, 2, 3, 4, 5, . . . , m, m+1, m+2, n, n+1, n+2, . . . , s+1, s+2, T, T+1, T+2, . . . , X, Y, Z) are distributed across hard disks 1-1 through 1-n using RAID0. No redundant information is provided using RAID0.

In RAID1, as shown in FIG. 3, an even number of hard disk drives 1-1 through 1-n are used. Hard disk drives 1-1 through 1-n are grouped into two groups G1 and G2 to store duplicate data (mirrored disk drives). Group G1 of hard disk drives 1-1 and 1-2 and group G2 of hard disk drives 1-(n-1) through 1-n are subjected to identical striping.

In RAID3, as shown in FIG. 4, input data is divided into parts A-00, B-00, C-00, A-01, B-01, C-01, . . . , A-0m, B-0m, C-0m, . . . J-00, K-00, L-00, J-01, K-01, L-01, . . . , 1-(n-1), 1-n. The parts of the divided data are respectively stored in a plurality of hard disk drives 1-1, 1-2, . . . , 1-(n-1). An error correction code, or parity, A-0P, B-0P, C-0P, . . . , J-0P, K-0P, L-0P is added and stored in hard disk drive 1-n.

In RAID5, as shown in FIG. 5, a plurality of hard disk drives 1-1, 1-2, . . . , 1-(n-1), 1-n are divided into sector-based parts. Input data is stored in logical blocks 0, 1, 2, 3, 4, 5, . . . , N-2, N-1, N, N+1, N+2, N+3, N+4, N+5, N+6, . . . , M-2, M-1, M, . . . , S, S+1, S+2, . . . , T, T+1, T+2, T+3, T+4, T+5, in each sector of the hard disk drives in an interleaving manner, as shown in FIG. 5. Also as shown in FIG. 5, an error correction code, or parity, 0P, is stored in each of the hard disk drives 1-1, 1-2, . . . , 1-(n-1), 1-n in an interleaving manner.

Conventionally, hard disk drives 1-n are formed of disk drives having an identical capacity in order to realize any of the operation modes of RAID. Hence, the control device 2 is designed to handle only hard disk drives having an identical capacity and an identical type.

However, use of hard disk drives having identical capacity and identical type decreases the degree of freedom in extending the disk array device. Combining different types of hard disk drives having different capacities is therefore impossible.

If a hard disk drive, which is a physical device, is newly added to the existing logical device, the total capacity of the logical device is changed. In this case, it is necessary to initialize the logical device. Therefore, a need arises to save data stored in the logical device. Hence, adding a hard disk drive to the existing disk array device is cumbersome, in the related art.

SUMMARY OF THE PRESENT INVENTION

The present invention solves the above-mentioned problems.

An object of the present invention is to provide a disk array building method and a disk array device.

Another object of the present invention is to define and operate a logical device in each storage area of each physical disk, improving the degree of freedom in defining logical devices.

A further object of the present invention is to define logical devices over a plurality of physical disks, even though the physical devices may have different storage capacities.

An additional object of the present invention is to select a logical device to be defined, taking into consideration the types of hard disk drives connected to the control device, defining the optimal logical device based on the capacities of the hard disk drives connected to the control device, so that the hard disk drives of different types can be utilized efficiently.

A further object of the present invention, if a predetermined logical device is a logical device which can be continuously striped, is to stripe continuous with the above-mentioned logical device a newly-connected hard disk drive can be striped, adding the newly-connected drive without changing the data stored in the predetermined logical device, and increasing the capacity of the predetermined logical device.

Still another object of the present invention is to select a logical device taking into account how data should be handled, selecting a logical device which is relatively more suitable for handling particular data and increasing the efficiency of processing the data.

Still a further object of the present invention is to define a plurality of logical devices over a plurality of physical disks, allowing for more efficient processing of various types of data.

Still an additional object of the present invention is to divide storage areas of a plurality of physical disks into logical blocks, and to define a logical device for each of the logical blocks, improving the degree of freedom in defining the logical blocks.

These together with other objects and advantages which will be subsequently apparent, reside in the details of construction and operation as more fully hereinafter described and claimed, reference being had to the accompanying drawings forming a part hereof, wherein like numerals refer to like parts throughout.

FIG. 6 shows an example of the principle of the present invention.

As shown in FIG. 6, logical device setting unit 5 defines logical device L1–LL in segmented storage areas S1–SM of a plurality of physical disks (hard disk drives) D1–DN.

A control device 2, to which the physical disks D1–DN are connected, operates the plurality of physical disks D1–DN as the logical devices L1–LL. Control device 2 is coupled to upper device 6 (such as a host computer).

In the present invention, a logical device is defined and operated in each storage area of each physical disk, as shown in FIG. 6. Hence, in the present invention, the degree of freedom in defining logical devices is improved. Accordingly, logical devices are defined over a plurality of physical disks, even though the physical devices may have different storage capacities.

Also in the present invention, a logical device to be defined is selected taking into consideration the types of hard disk drives connected to the control device. Hence, the optimal logical device can be defined based on the capacities of the hard disk drives connected to the control device, so that the hard disk drives of different types can be utilized efficiently.

In addition, in the present invention, if a predetermined logical device is a logical device which can be continuously striped, then a newly-connected hard disk drive can be striped to be continuous with the above-mentioned logical device. Hence, the newly-connected drive can be added without changing the data stored in the predetermined logical device and the capacity of the predetermined logical device can be increased.

Further in the present invention, a logical device can be selected taking into account how data should be handled. Hence, it is possible to select a logical device which is relatively more suitable for handling particular data, increasing the efficiency of processing the data.

In the present invention, a plurality of logical devices are defined over a plurality of physical disks and hence various types of data are processed relatively more efficiently.

Also in the present invention, storage areas of a plurality of physical disks can be divided into logical blocks, and a logical device can be defined for each of the logical blocks. Hence, the degree of freedom in defining the logical blocks is improved.

The present invention is applicable to, for example, Stripe RAID0 or Sequential RAID0. Stripe RAID0 is equivalent to RAID3, but without providing parity.

BRIEF DESCRIPTION OF THE DRAWINGS

FIG. 4 is a diagram for explaining RAID3 mode;

FIG. 5 is a diagram for explaining RAID5 mode;

FIG. 6 is a diagram of the principle of the present invention;

FIG. 7 is a block diagram of a disk array device according to an embodiment of the present invention;

FIG. 8 is a diagram explaining a connection of hard disk drives according to the embodiment of the present invention;

FIGS. 10A and 10B are diagrams explaining a striping method in a RAID0 mode according to the embodiment of the present invention;

FIG. 13 is a diagram explaining a striping method in a RAID5 mode according to the embodiment of the present invention;

FIG. 17 is a flowchart of an operation of a control device shown in FIG. 7;

DESCRIPTION OF THE PREFERRED EMBODIMENTS

Figure 1:
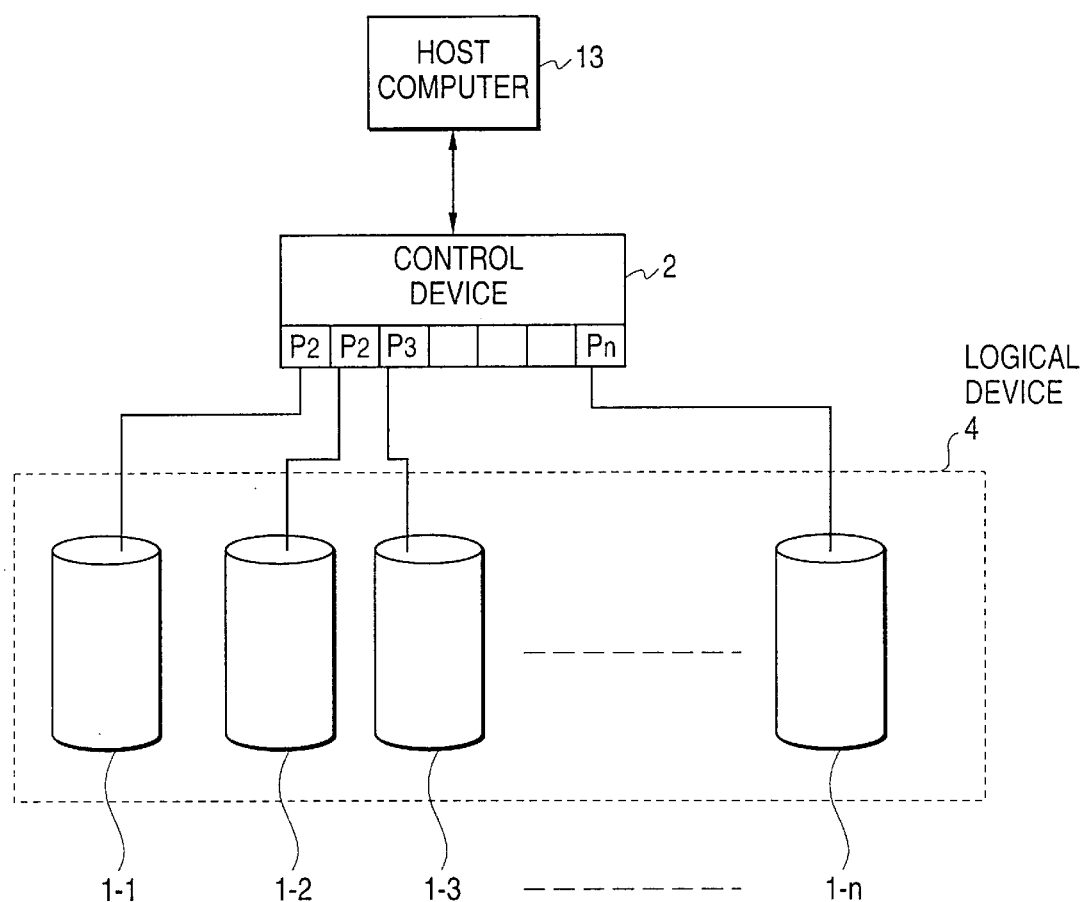
FIG. 1 is a block diagram of an example of a conventional disk array device.
Figure 2:
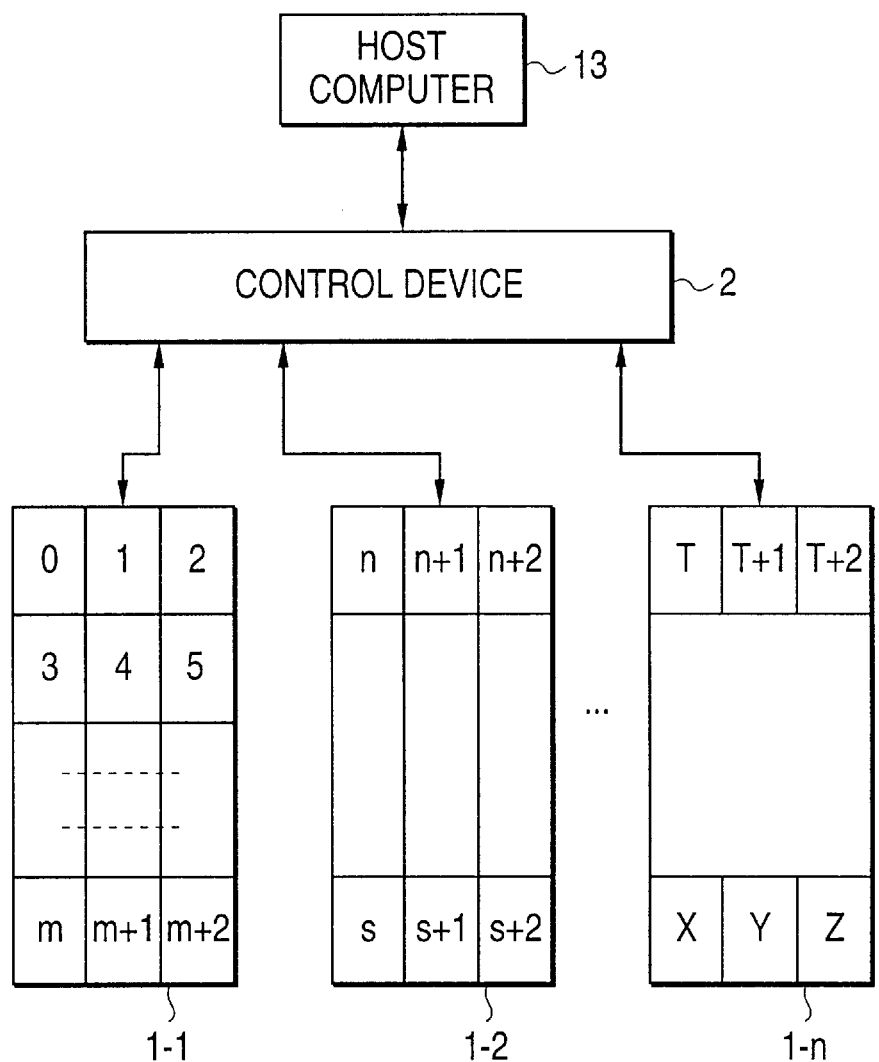
FIG. 2 is a diagram for explaining RAID0 mode.
Figure 3:
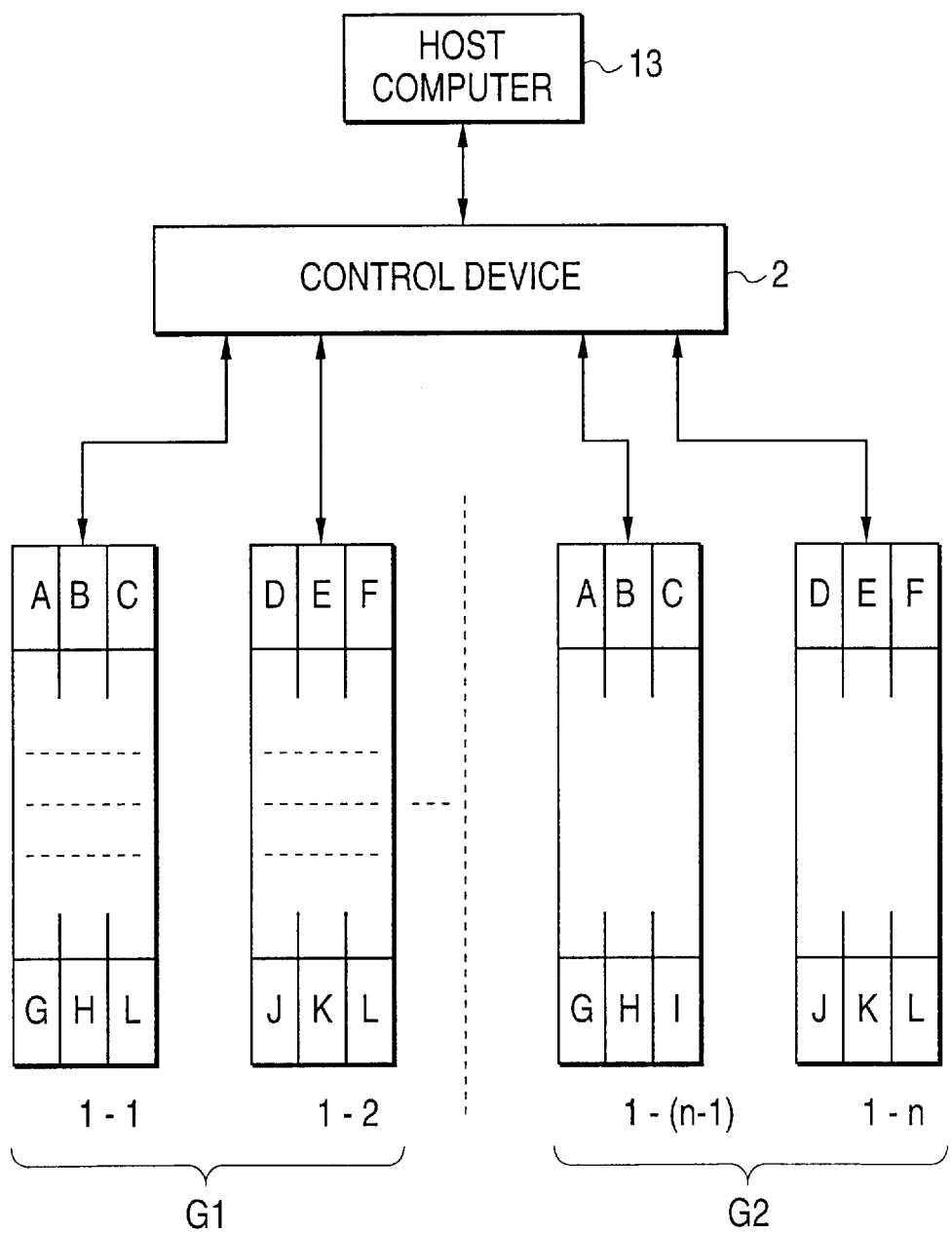
FIG. 3 is a diagram for explaining RAID1 mode.

FIG. 7 is a block diagram of a disk array device according to an embodiment of the present invention. A disk array device 11 according to the present embodiment includes hard disk drives (physical disks) 12-1–12-N, and a control device (which may be referred to as an ACL: Array Control Logic) 14. The hard disk drives 12-1–12-N store data. The control device 14 is connected between the hard disk drives 12-1–12-N and a host computer 13. The control device 14 controls an operation of storing data from the host computer 13 to the hard disk drives 12-1–12-N and reading data from the hard disk drives 12-1–12-N. As shown in FIG. 7, the disk array device 11 of the present invention comprises control device 14, and hard disk drives 12-1–12-N. The disk array device 11 of the present invention may also comprise another control device 14', and be configured as shown in FIG. 7.

The hard disk drives 12-1–12-N shown in FIG. 7 have disk-shaped magnetic recording media, which are rotated. Magnetic heads are positioned to face the rotatable magnetic recording media. The magnetic heads are magnetically excited according to data, so that the magnetic recording media are magnetized. The magnetic heads are moved so that data is recorded on the magnetic recording media in a concentric formation. Logical blocks are mapped to the hard disk drives 12-1–12-N by the control device 14. Logic devices, each formed by the logical blocks, are defined, and are used to store corresponding data.

The term "logical block" is defined as, for example, the minimum unit of data which can be handled by an operating system (OS). The term "physical block" is defined as, for example, the minimum unit of data which can be read from or written into the disk array device by a single I/O instruction.

The control device 14, which in a preferred embodiment is implemented by a CPU (Central Processing Unit) or MPU (MicroProcessor Unit), includes a host adapter (HA) 19, a cache memory 15, device adapters DA0–DAn (200–20n), a control circuit 16, a coupling circuit 17, and a logical device setting part 18. The host adapter (HA) 19, which is connected to the host computer 13, transmits data to the host computer 13 and receives data therefrom. The cache memory 15, which is connected to the host adapter (HA) 19, temporarily stores data transmitted to and received from the host computer 13. The device adapters DA0–DAn (200–20n), which are connected to the hard disk drives 12-1–12-N, transmit data to the hard disk drives 12-1–12-N and receive data therefrom. The control circuit 16 operates the hard disk drives 12-1–12-N as a single logical device or a plurality of logical devices. The coupling circuit 17 arbitrates between the control device 14 and another control device 14'. The logical device setting part 18 sets (defines) logical devices by using logical blocks mapped to arbitrarily segmented storage areas of each of the hard disk drives 12-1–12-N, and establishes the logical devices in rank0–rank3.

The logical device setting part 18 comprises a memory, and stores and manages, for each logical block of hard disk drives 12-1–12-N connected to the device adapters DA0–DAn (200–20n), the striped states of the logical device, each being formed by logical blocks.

Figures 9A, 9B:
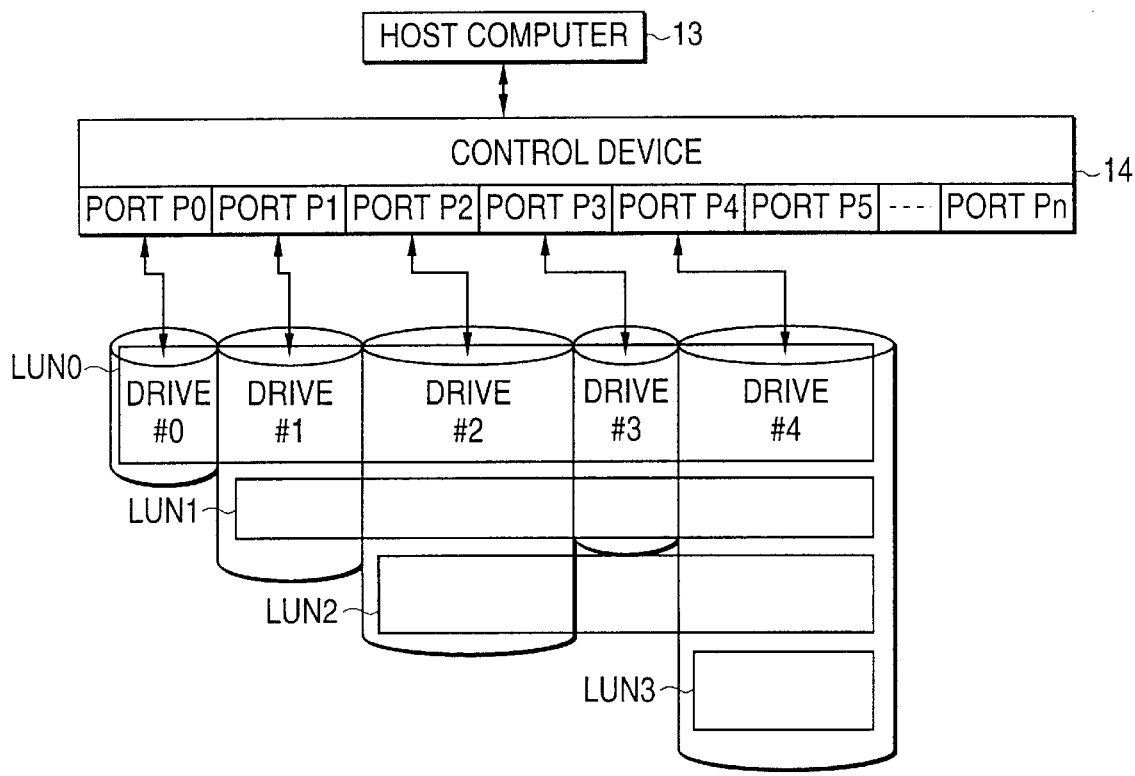
FIGS. 9A and 9B are diagrams explaining logical devices defined over the hard disk drives according to the embodiment of the present invention.

A description will now be given of a striping method by the logical device setting part 18 for a case in which hard disk drives having different capacities are connected to the host computer 13. FIGS. 8, 9A and 9B are diagrams explaining a connection of hard disk drives according to the present embodiment of the invention.

As shown in FIG. 8, according to the present embodiment, disk drives #0–#4 have different capacities. Disk drives #0–#4 are connected, respectively, to ports P0–P4 of the control device 14. In the present invention, the logical device setting part 18 sets (or defines) logical devices for each storage area of disk drives #0–#4. Hence, as shown in FIGS. 9A and 9B, a plurality of logical devices LUN0–LUN3 are defined.

As shown in FIG. 9A, control device 14 is coupled to host computer 13. Control device 14 includes ports P0–Pn. In the example shown in FIG. 9A, ports P0–P4 are coupled, respectively, to disk drives #0–#4 (Drives #0–#4). Logical device LUN0 comprises parts of each of disk drives #0–#4. Logical device LUN1 comprises parts of each of disk drives #1–#4. Further, as shown in FIG. 9A, logical device LUN2 comprises parts of each of disk drives #2 and #4, while logical device LUN3 comprises parts of disk drive #4 only.

FIG. 9B is a table describing the mapping of the logical devices LUN0–LUN3 onto disk drive #0–disk drive #4 shown in FIG. 9A, in the present invention. As described in FIG. 9B, in LUN0 RAID levels 3 and 5 are implemented, with 4 of the disk drives #0–4 storing data and one of the disk drives #0–4 storing parity. In LUN1, RAID0 is implemented across disk drives #1–#4 storing data only. In LUN2, RAID2 is implemented across disk drives #2 and #4, with one of the disk drives storing data and the other of the disk drives mirroring the data stored on the one of the disk drives. Also as shown in FIG. 9B, in LUN3, RAID0 is implemented across disk drive #4 only, and stores data only.

A striping method in RAID0 mode in the present invention will be described with reference to FIGS. 10A and 10B. FIGS. 10A and 10B are diagrams which show the striping method in RAID0 mode, in accordance with the present invention. More particularly, FIG. 10A shows striping in a sequential RAID0 mode, in which 0, 1, 2, 3, . . . , m, m+1, . . . , p, p+1, . . . respectively denote logical blocks or logical block numbers. When a hard disk drive having a capacity different from that of the already connected disk drives is newly connected to the existing disk array device and sequential RAID0 mode is, the logical block numbers are sequentially assigned in the order of parts P0–Pn.

First, logical blocks are sequentially mapped to hard disk drive #0. Hard disk drive #0 is connected to port P0. In the case shown in FIG. 10A, logical blocks 0–m+5 can be sequentially mapped to disk drive #0. Next, logical blocks are sequentially mapped to disk drive #1, which is connected to port P1. In the case shown in FIG. 10A, logical blocks m+6–n+5 subsequent to logical block m+5 can be sequentially mapped to disk drive #1. Then, logical blocks are sequentially mapped to disk drive #2, which is connected to port P2.

In the case shown in FIG. 10A, logical blocks n+6–p+5 subsequent to logical block n+5 can be sequentially mapped to disk drive #2. Thereafter, logical blocks are sequentially mapped to disk drive #3, which is connected to port P3. In the case shown in FIG. 10A, logical blocks starting from p+6 following logical block p+5 can be sequentially mapped to disk drive #3. Hence, in the present invention, a single logical block is built even if the disk drives respectively connected to port P0–Pn have different capacities.

FIG. 10B shows striping in a striped RAID0 mode, in accordance with the present invention. As shown in FIG. 10B, A-00, A-01, A-02, . . . , B-00, B-01, B-02, . . . , W-00, W-01, W-02, . . . respectively denote logical block numbers.

In the example shown in FIG. 10B, disk drives #0 and #3 each have a smaller capacity than disk drive #1, which has a smaller capacity than disk drive #2.

In striping in the striped RAID0 mode, logical blocks are sequentially mapped to disk drives #0–#3 in the same manner as normal striped RAID0 mode, until disk drives #0 and #3 are filled with logical blocks. That is, disk drives #0–#3 are sequentially assigned logical blocks A-00, A-01, A-02, A-03, B-00, B-01, B-02, B-03, C-00, . . . , M-00, M-01, M-02, M-03, in that order, until disk drives #0 and #3 are filled with logical blocks. Then, disk drives #1 and #2 are sequentially assigned logical blocks S-01, S-02, S-03, S-04, T-01, T-02, T-03, T-04. After disk drive #1 is filled with logical blocks, logical blocks, W-01, W-02, W-03, W-04 are mapped to disk drive #2.

Figure 11:
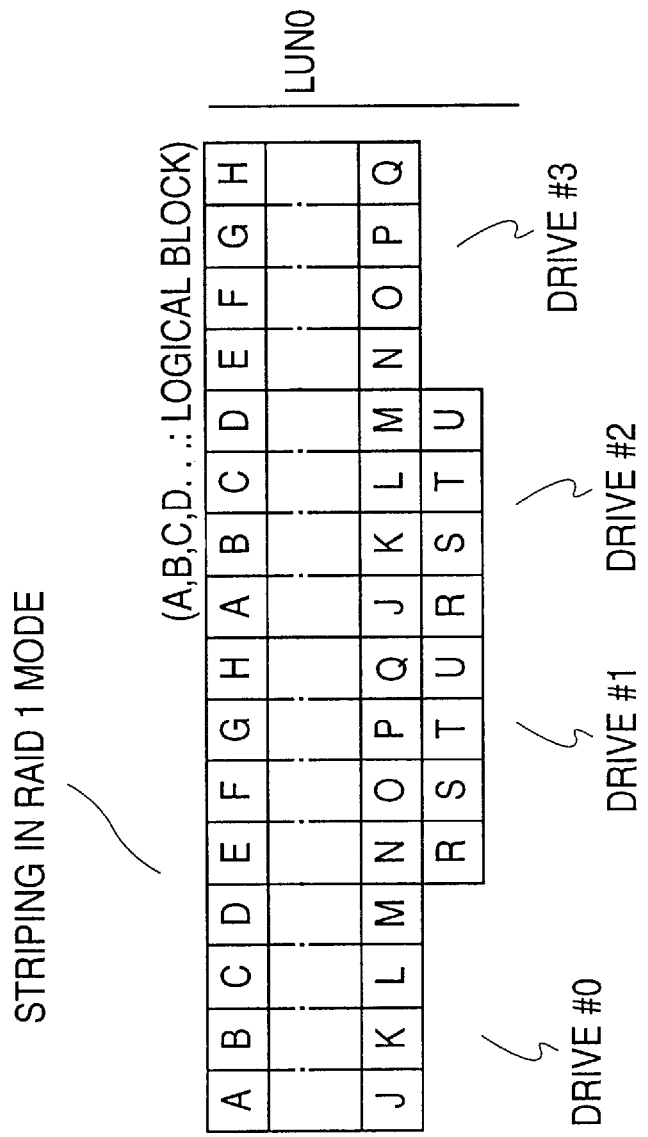
FIG. 11 is a diagram explaining a striping method in a RAID1 mode according to the embodiment of the present invention.

FIG. 11 shows a striping method in RAID1 mode, in accordance with the present invention. In the striping method shown in FIG. 11, A, B, C, D, . . . respectively denote logical blocks. When striping in RAID1 mode is applied to disk drives having different capacities, an even number of disk drives must be connected. In the example shown in FIG. 11, an even number of (four) disk drives #0–#3 is divided into two groups: (1) disk drives #0–#1, and (2) disk drives #2–#3. Further, one of the disk drives #0 and #1 which has the smaller capacity and one of the disk drives #2 and #3 which has the smaller capacity are paired with each other. Referring to the example shown in FIG. 11, disk drives #0 and #3 are paired, and logical blocks are sequentially mapped to the pair of disk drives #0 and #3 as shown. Also as shown in FIG. 11, the remaining disk drives #1 and #2 are paired, and logical blocks are sequentially mapped thereto. In the above manner, a single logical device LUN0 in RAID1 mode can be defined.

Figure 12:
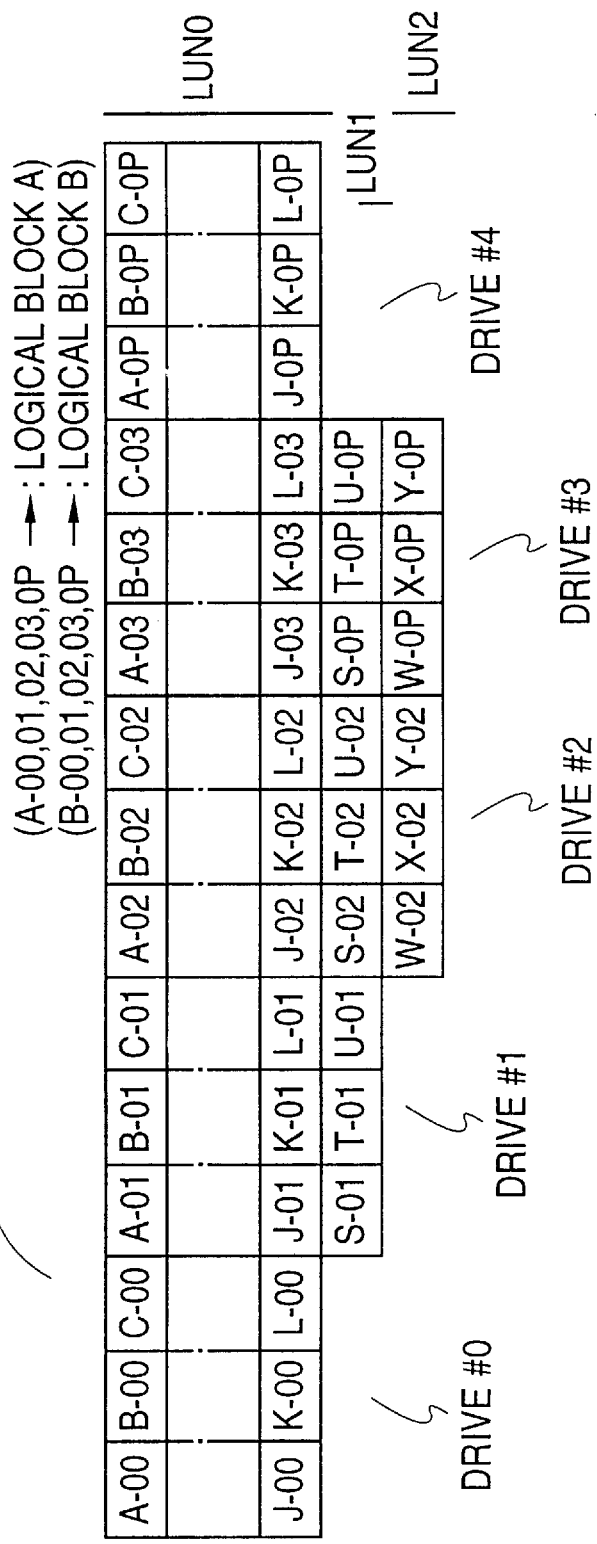
FIG. 12 is a diagram explaining a striping method in a RAID3 mode according to the embodiment of the present invention.

FIG. 12 shows a striping method in RAID3 mode. In the example shown in FIG. 12, A-00, A-01, A-02, A-03, A-0P, B-00, B-01, B-02, . . . , B-0P, . . . , L-00, L-01, . . . , L-0P, S-01, . . . , S-0P, Y-01, . . . , Y-0P denote logical blocks. Also in the example shown in FIG. 12, disk drives #0–#4 have different capacities. When striping in RAID3 mode is applied to disk drives #0–#4, a logical block A is formed by logical devices A-00, A-01, A-02, A-03 and A-0P respectively assigned to disks #0–#4. Further, a logical block B is formed by logical devices B-00 B-01, B-02, B-03 and B-0P respectively assigned to disks #0–#4. Similarly, a logical block L is formed using disks #0–#4. A logical block S is formed by logical devices S-01, S-02 and S-0P respectively assigned to the remaining areas of disk drives #1, #2 and #3. Similarly, a logical block T is formed by logical devices T-01, T-02 and T-0P respectively assigned to the remaining areas of disk drives #1, #2 and #3, and a logical block U is formed by logical devices U-01, U-02 and U-0P respectively assigned thereto. A logical block W is formed by logical devices W-01 and W-0P respectively assigned to the remaining areas of disk drives #2 and #3, and a logical block X is formed by logical devices X-02 and X-0P respectively assigned thereto. Further, a logical block Y is formed by logical blocks Y-02 and Y-0P respectively assigned to the remaining areas of disk drives #2 and #3.

In the above manner, a first single logical device LUN0 is formed by logical blocks A–L, and a second single logical device LUN1 is formed by logical blocks S, T and U. Further, a third single logical device LUN2 is formed by logical blocks W, X and Y. That is, three logical devices LUN0, LUN1 and LUN2 having different capacities can be formed in RAID3 mode, as shown in the example of FIG. 12.

FIG. 13 shows an example of the striping method in RAID5 mode, in accordance with the present invention. As shown in FIG. 13, when logical devices in RAID5 mode are formed using disk drives #0–#4 (which disk drives have different capacities), logical blocks and parity blocks are mapped to Drives #0–#4 so that the parity blocks are distributed across Drives #0–#4. The above step is carried out until the disk drive #4 having the smallest capacity is filled with blocks. In the example shown in FIG. 13, the logical blocks and parity blocks are mapped to disk drives #0–#4 in the following order: logical blocks 0–11, parity blocks P-0, P-1, P-2, logical blocks 12–23, and parity blocks P-12, P-13, P-14. A set of parities P-0, P-1 and P-2 is set to disk drive #4, and a set of parities P-12, P-13 and P-14 is set to disk drive #3. In the above manner, logical device LUN0 in normal RAID5 mode is defined, in accordance with the present invention.

Next, logical blocks and parity blocks are mapped to the remaining disk drive #0–#3 so that the parity blocks are distributed across disk drive #0–#3. The foregoing operation is carried out until disk drive #0 (which disk drive has the smallest capacity of disk drives #0–#3) is filled with blocks. In the example shown in FIG. 13, disk drives #0–#3 are sequentially assigned logical blocks 50–58, parity blocks P-50, P-51, P-52, logical blocks 59–67, parity blocks P-59, P-60, P61. In this manner, logical device LUN1 in normal RAID5 mode is defined, in accordance with the present invention.

Similarly in the present invention, logical device LUN2 in RAID5 mode is formed by using the remaining storage areas of disk drives #1, #2 and #3, and logical device LUN3 in RAID5 is formed by using the remaining storage areas of disk drives #2 and #3. In the above manner, the present invention provides logical devices LUN0–LUN3 having different capacities.

Figure 14:
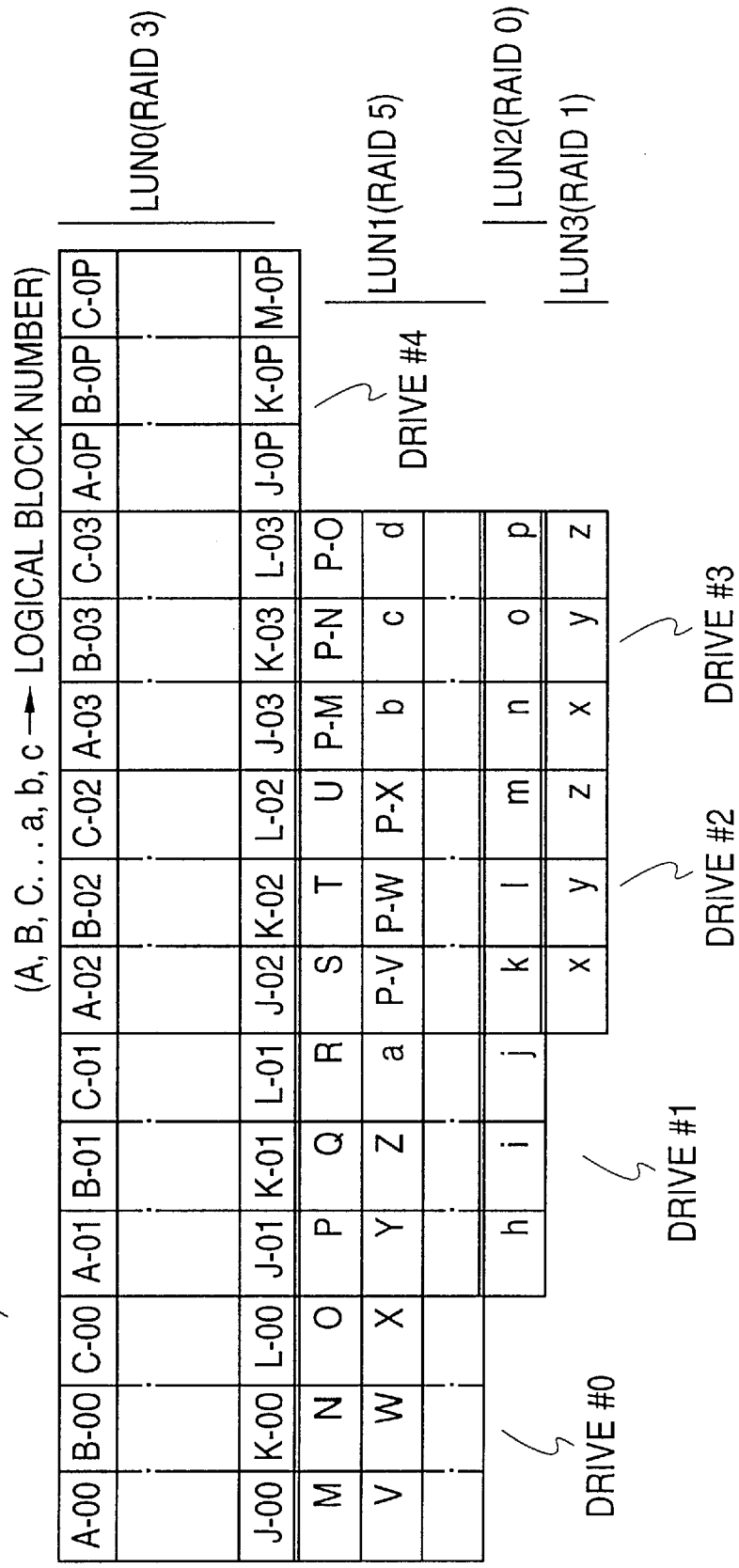
FIG. 14 is a diagram explaining a striping method in a mixed RAID mode according to the embodiment of the present invention.

FIG. 14 shows a striping method in a mixed RAID mode which uses at least two of the above-mentioned RAID modes. The example shown in FIG. 14 has five disk drives #0–#4. The first step of the striping method shown in FIG. 14 is to form logical device LUN0. Logical device LUN0 is operating in, for example, RAID3 mode by using disk drives #0–#4 so that a storage capacity equal to the smallest storage capacity among disk drives #0–#4 is used. In the example shown in FIG. 14, disk drive #4 has the smallest capacity; accordingly, the storage areas of disk drives #0–#3 equal to the smallest capacity of disk drive #4 are used to form logical device LUN0.

Next, striping is carried out in the present invention by using the remaining four disk drives #0–#3, as shown in FIG. 14. In this case, the storage capacity of each of disk drives #0–#3 is used to form logical device LUN1 operating in, for example, RAID5 mode, is equal to the smallest storage capacity among disk drives #0–#3.

Then, striping is carried out by using the remaining three disk drives #1–#3. In this case, the storage capacity of each of disk drives #1–#3 used to form logical device LUN2 operating in, for example, RAID0 mode, is equal to the smallest capacity among disk drives #1–#3.

Finally in the example shown in FIG. 14, logical device LUN3 operating in, for example, RAID1 mode, is formed by using disk drives #2 and #3, each having the same storage capacity. In the above manner, a plurality of logical devices having the respective, different RAID modes can be formed by using a plurality of disk drives having different storage capacities.

Figure 15:
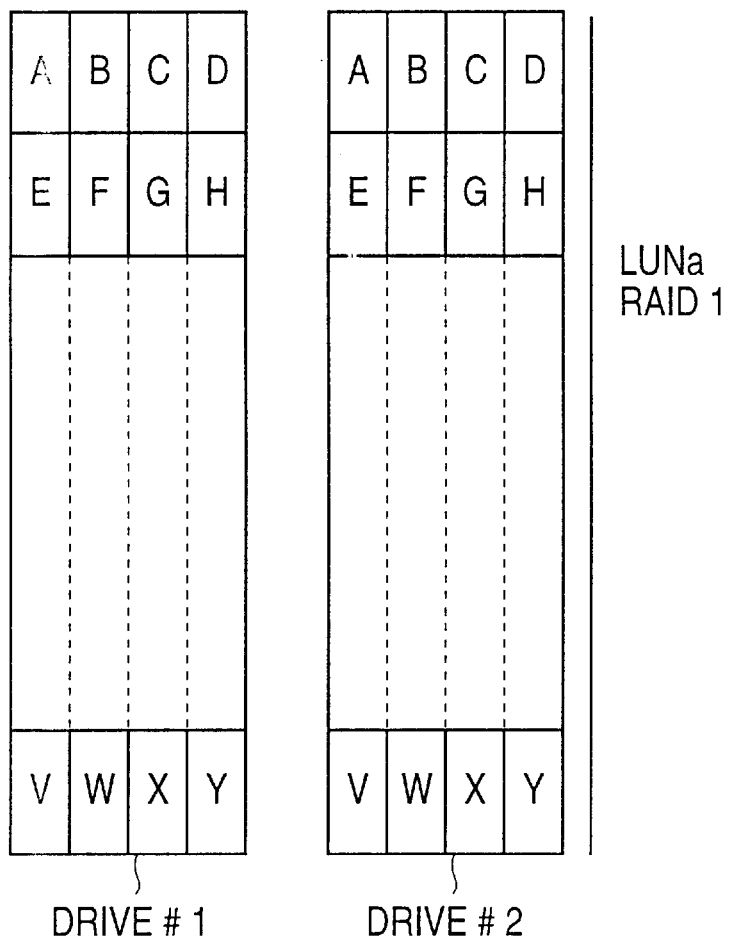
FIG. 15 is a diagram explaining a striping method to be executed when newly adding hard disk drives to an existing disk array device according to the embodiment of the present invention.
Figure 16B:
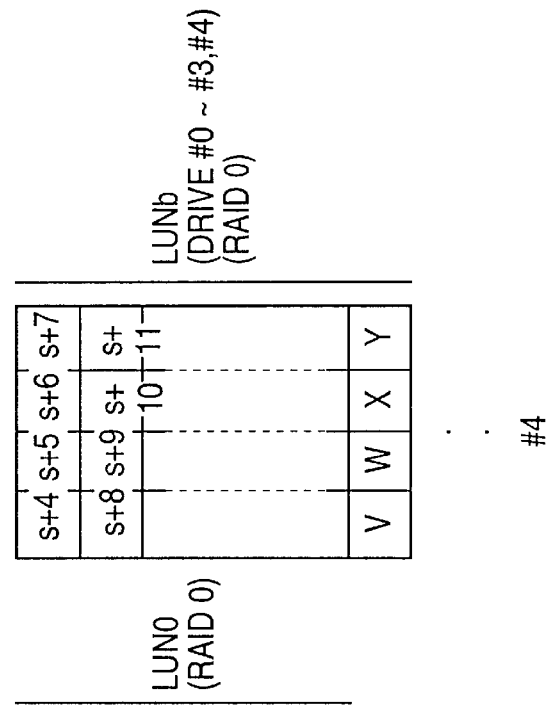
FIGS. 16A and 16B are diagrams explaining in more detail the above striping method to be executed when newly adding hard disk drives to an existing disk array device according to the embodiment of the present invention.
Figure 16A:
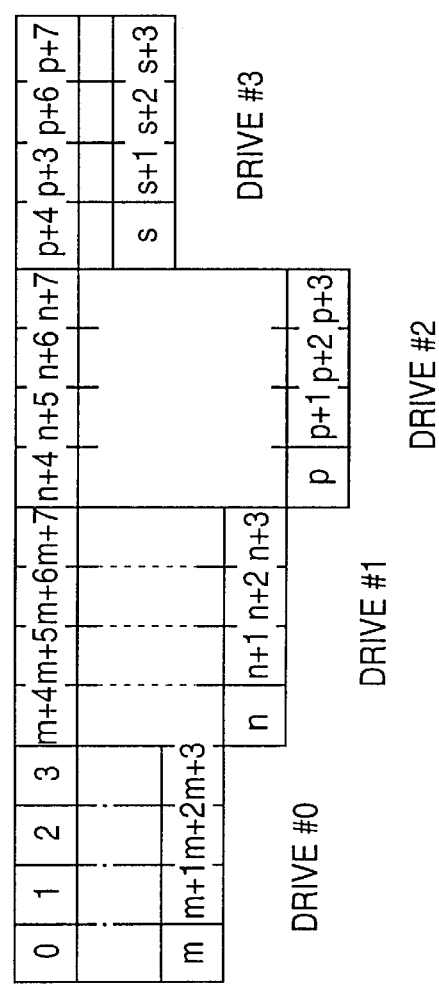

FIGS. 15, 16A and 16B show a striping method carried out by the present invention when extending the disk array device by adding a new disk drive thereto. If a new disk drive is added to the disk array device in which one or more logical devices are already formed, RAID1 or RAID0 mode is needed to maintain the definition (or setting) of the logical devices formed in the existing disk array device.

FIG. 15 shows a striping method used when extending the disk array device in RAID1 mode in the present invention. In the example shown in FIG. 15, two disk drives #1 and #2 having an identical storage capacity are used to extend the disk array device. Logical blocks A–Y are mapped to disk drive #1 of logical device LUNa, and mirrored logical blocks A–Y of logical device LUNa are mapped to disk drive #2. As shown in FIG. 15, mirrored logical blocks A–Y mapped to disk drive #2 mirror logical blocks A–Y of disk drive #1. In this manner, the logical devices of RAID1 mode are defined in the present invention.

FIGS. 16A and 16B show a striping method used when extending the disk array device in RAID0 mode, in the present invention. As shown in FIG. 16A, the existing disk array device has four disk drives #0–#3, in which logical device LUN0 of RAID0 mode is formed. FIG. 16B shows a new disk drive #4 being added to the existing disk array device, in accordance with the present invention. Disk drive

4 has a storage capacity different from the capacities of the disk drives #0–#3. As shown in FIGS. 16A and 16B, logical blocks S+4, S+5 . . . , V, W, X, Y are sequentially mapped to disk drive #4 and follow logical block S+3, which is the last logical block mapped to logical device LUN0 of RAID0 mode. Hence, logical device LUNb of RAID0 mode is defined by disk drives #0–#3 and #4 in the present invention, as shown in FIG. 16B.

As described above, the present invention adds a new disk drive to an existing disk array device, extending the existing disk array device without changing the existing configuration of the logical devices in the existing disk array device.

Figure 18:
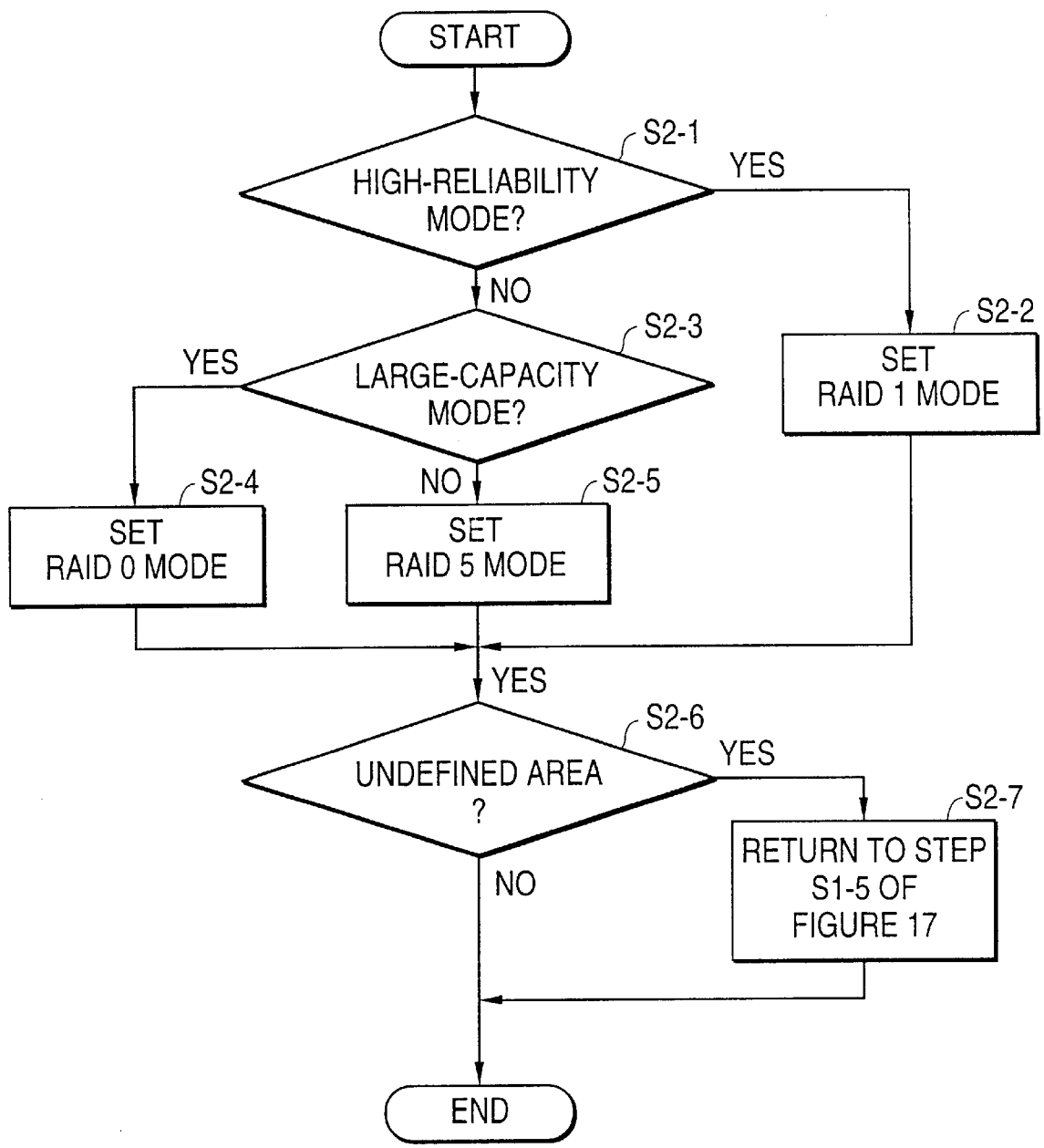
FIG. 18 is a flowchart of a first process executed at step S1-6 shown in FIG. 17.
Figure 19:
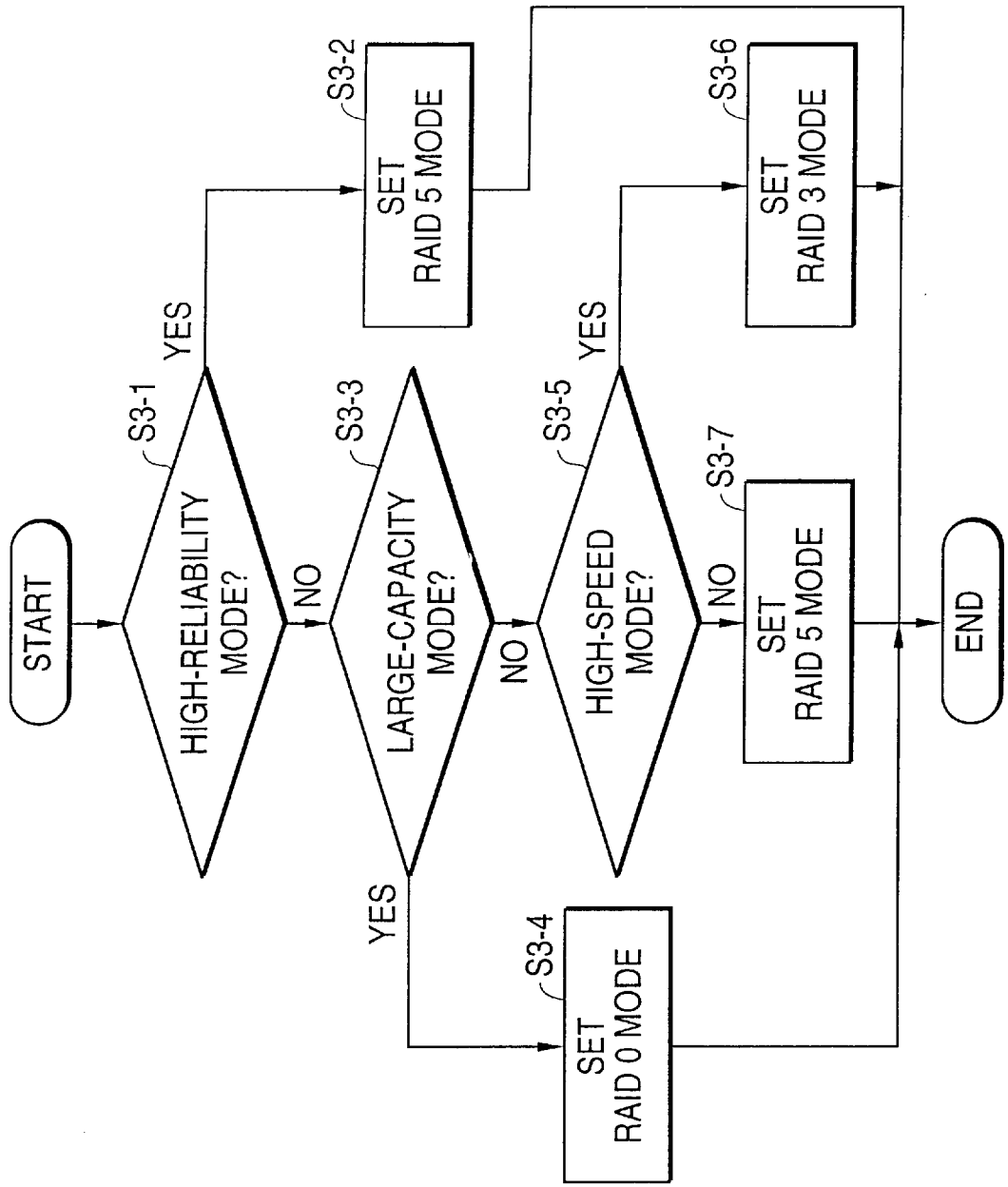
FIG. 19 a flowchart of a second process executed at step S1-7 shown in FIG. 17.

FIGS. 17, 18 and 19 are flowcharts of the operation of the control device 14 (shown in FIG. 7) of the present invention. In particular, FIGS. 17, 18, and 19 are directed to an embodiment of the present invention in which all disk drives are newly-added to the disk array device 11. When a hard disk drive is newly connected to device adapters DA0–DAn in the control device 14 (shown in FIG. 7), the device adapters DAx (x=0–n) detect that the hard disk drive is newly connected. The control device 14 then obtains information necessary to control the newly-connected drives, such as a predetermined number of revolutions, a control interface, and a data transfer rate by reading the information from each of the newly-connected drives.

Referring now to FIG. 17, in step S1-1, control device 14 determines whether a hard disk drive is newly connected to the disk array device 11. More particularly, device adapter DAx (x=0–n) shown in FIG. 7 detects that a hard disk drive is newly added. The device adapter DAx then reads from the newly-connected drive the following information, presented above, necessary to control the newly connected drive, such as a predetermined number of revolutions, a control interface, and a data transfer rate. The above-mentioned information is transmitted to the control circuit 16 (shown in FIG. 7) by the device adapter DAx. The control circuit 16 recognizes the information read from the newly connected drive through the terminal adapter DAx, such as the number of revolutions, control interface and data transfer rate of the newly connected drives.

Then, at step S1-2 of FIG. 17, the control circuit 16 determines whether the number of revolutions of the newly connected drive is equal to the number of revolutions of any of the connected hard disk drives. If the result of step S1-2 is NO, the process proceeds to step S1-8, as shown in FIG. 17. If the result of step S1-2 is YES, the control circuit 16 determines, at step S1-3 of FIG. 17, whether a control interface of the newly connected drives is the same as the control interface of any of the other connected drives. If the result of step S1-3 is NO, the process proceeds to step S1-8. If the result of step S1-3 is YES, the process proceeds to step S1-4.

In step S1-4 of FIG. 17, the control circuit 16 determines whether the data transfer rate of the newly connected drives is equal to the data transfer rate of any of the other connected hard disk drives. If the result of step S1-4 is NO, the process proceeds to step S1-8. If the result of step S1-4 is YES, that is, when the control circuit 16 concludes that the newly connected drives are the same as any of the other connected drives, the control circuit 16 executes step S1-5 of FIG. 17.

At step S1-5, the control circuit 16 recognizes the total number of hard disk drives from corresponding drive information stored in the control circuit 16. If it is determined at step S1-5 of FIG. 17 that there is an even number of hard disk drives, a first setting process (which is described below with reference to FIG. 18) for the newly added disk drive is carried out in step S1-6. If it is determined that there is an odd number of hard disk drives, a second setting process (which is described below with reference to FIG. 19) for the newly added disk drive is carried out in step S1-7 of FIG. 17. In step S1-8 of FIG. 17, all the hard disk drives are set to the sequential RAID0 mode.

FIG. 18 is a flowchart of the above-mentioned first process. The first process is executed if the result of step S1-5 shown in FIG. 17 is YES. Referring now to FIG. 18, in step S2-1 the control circuit 16 detects a predetermined setting mode of the newly added disk drive. The predetermined setting mode is set beforehand by a user. If the predetermined setting mode is a high-reliability mode in which data stored on the newly-added hard disk drive must be highly reliable, the control circuit 16 sets RAID1 mode at step S2-2 of FIG. 18. If the result of step S2-1 is NO, the control circuit 16 executes step S2-3. In step S2-3 of FIG. 18, it is determined whether the predetermined setting mode is a large-capacity mode. If the result of step S2-3 is YES, the control circuit 16 sets RAID0 mode at step S2-4. If the result of step S2-3 is NO, the control circuit 16 sets RAID5 mode at step S2-5.

Then, the control circuit 16 determines, at step S2-6 of FIG. 18, whether there is an undefined area in which no operation mode is defined. If the result of step S2-6 is YES, then step S2-7 of FIG. 18 returns the process returns to step S1-5 of FIG. 17. If the result of step S2-6 is NO, the first process ends.

FIG. 19 is a flowchart of the above-mentioned second process which is executed when the result of step S1-5 shown in FIG. 17 is NO. At step S3-1, the control circuit 16 detects the predetermined setting mode which is set beforehand by a user. If the predetermined setting mode is indicates that the high-reliability mode (in which data is highly reliable) is required, the control circuit 16 sets RAID5 mode at step S3-2.

If the result of step S3-1 is NO, the control circuit 16 executes step S3-3 of FIG. 19. In step S3-3, it is determined whether the predetermined setting mode is large-capacity mode. If the result of step S3-3 is YES, the control circuit 16 sets RAID0 mode in step S3-4.

If the result of step S3-3 of FIG. 19 is NO, the control circuit 16 determines whether the predetermined setting mode is a high-speed mode, in which data can be written or read at a relatively high speed. If the result of step S3-5 is NO, the control circuit 16 sets RAID5 mode in step S3-7. If the result of step S3-5 is YES, the control circuit 16 sets RAID3 mode at step S3-6. After step S3-4, S3-6 or S3-7 is executed, the second process ends.

According to the above control executed by the control device 19, the present invention determines an efficient and effective RAID mode taking into consideration the capacity of a newly added hard disk drive and RAID mode or RAID modes of the connected disk array device.

The flowcharts shown in FIGS. 18 and 19 describe the process of determining, in the present invention, whether the newly-connected hard disk drives can be configured using RAID3 or RAID5, instead of RAID0. The above-mentioned comparisons of the rotational speeds, the interface, and the transfer speed determine whether those of the newly-connected disk drives are different than those of the other connected disk drives. If the foregoing are different, then configuring the newly-connected disk drives for RAID3 or RAID5 would not be preferred because of problems which may arise in synchronization of all disk drives with each other.

Figure 20:
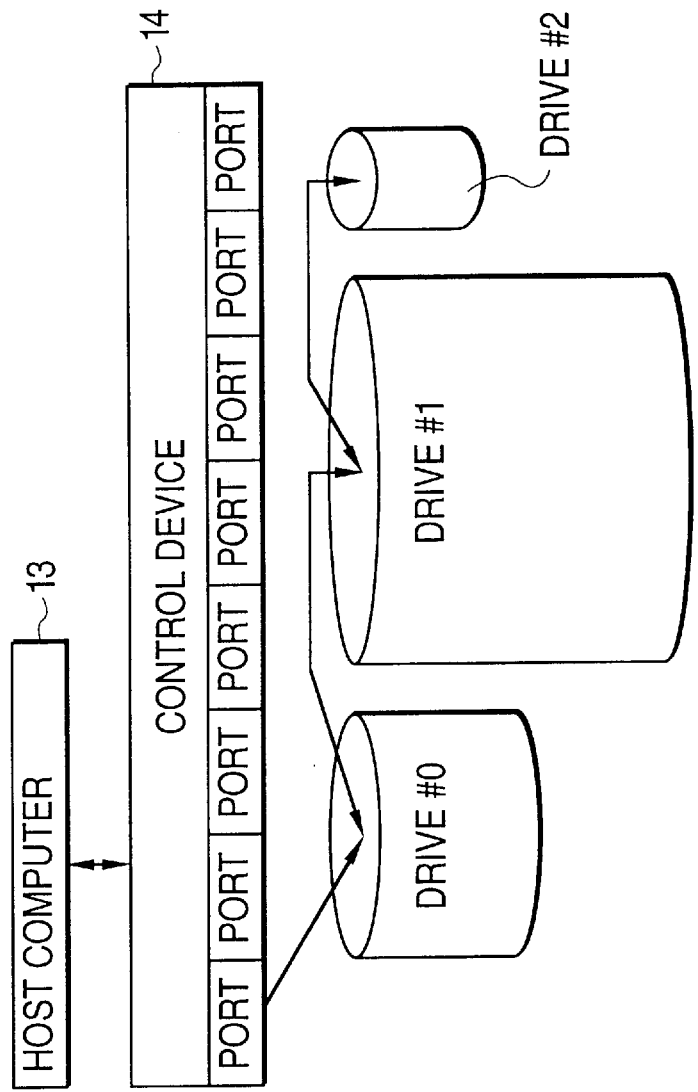
FIG. 20 is a diagram of a first variation of the embodiment of the present invention.

In the above-mentioned embodiment of the present invention, one hard disk drive is connected to one port. Alternatively in the present invention, as shown in FIG. 20, a plurality of hard disk drives #0, #1 and #2 may be connected to one port P0. The example of FIG. 20 shows disk drive #0 connected to the one port, with disk drive #1 connected in cascade to disk drive #0 and disk drive #2 connected in cascade to disk drive #1. The foregoing addition of a hard disk drive to the configuration shown in FIG. 20 occurs in the present invention consistent with the above-mentioned description of disk drives connected to ports on a one-to-one basis, but with the device adapter connecting disk drive #0 to control device 14 making the foregoing determination of information necessary to add a new hard disk.

Figure 21:
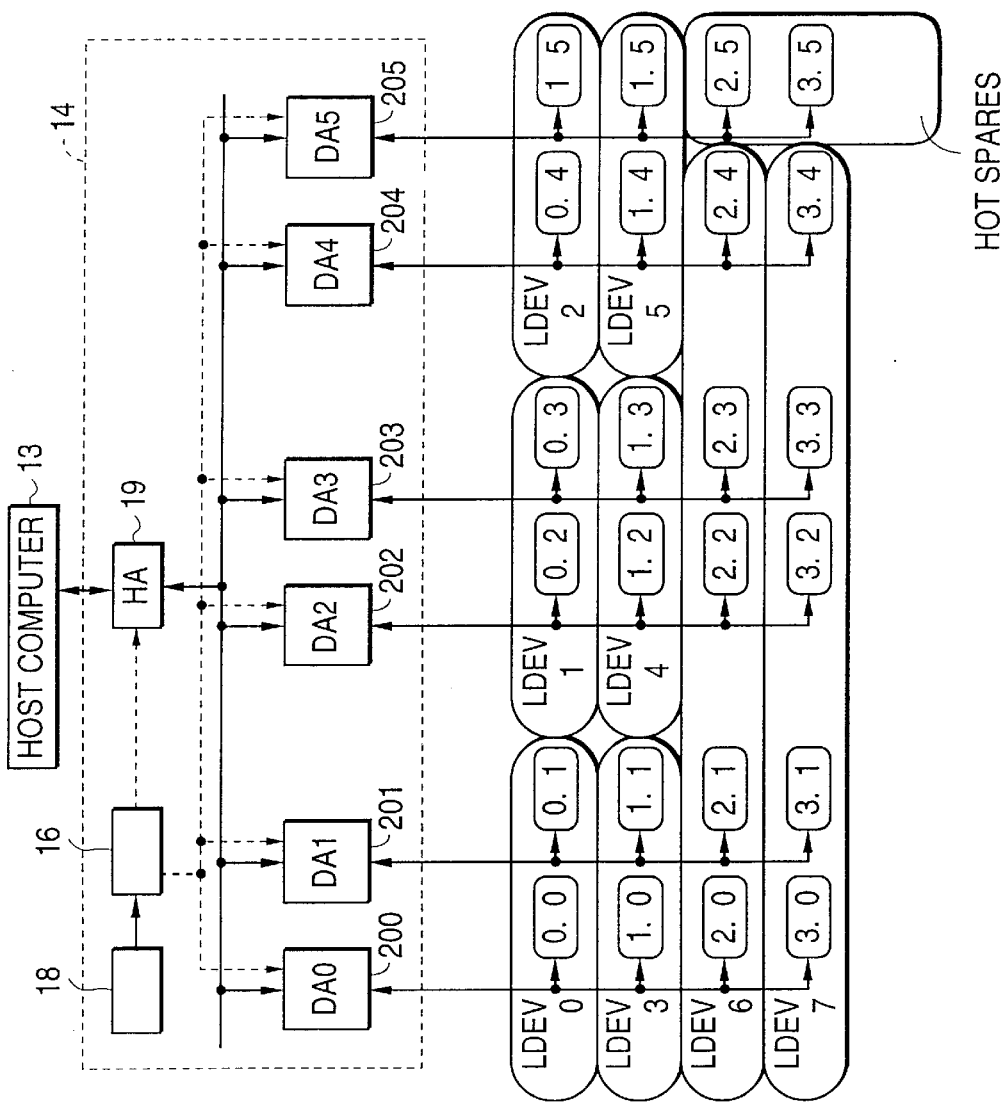
FIG. 21 is a diagram of a second variation of the embodiment of the present invention.

Further, as shown in FIG. 21, a plurality of hard disk drives can be connected to each of a plurality of ports in the present invention. In the example shown in FIG. 21, a large number of logical devices (having RAID modes) are set (defined) by the logical device setting port 18. In FIG. 21, LDEV0–LDEV7 respectively denote logical devices. As shown in FIG. 21, four physical disks (hard disk drives) (0,0)–(3,0) are connected to the port of device adapter DA0, four physical disks (0,1)–(3,1) are connected to the port of device adapter DA1, four physical disks (0,2)–(3,2) are connected to the port of device adapter DA2, four physical disks (0,3)–(3,3) are connected to the port of device adapter DA3, four physical disks (0,4)–(3,4) are connected to the port of device adapter DA4, and four physical disks (0,5)–(3,5) are connected to the port of device adapter DA5.

As shown in FIG. 21, LDEV0 is mapped to physical disks (0,0) and (0,1), LDEV1 is mapped to physical disks (0,2) and (0,3), LDEV2 is mapped to physical disks (0,4) and (1,5), LDEV3 is mapped to physical disks (1,0) and (1,1), LDEV4 is mapped to physical disks (1,2) and (1,3), LDEV5 is mapped to physical disks (1,4) and (1,5), LDEV6 is mapped to physical disks (2,0), (2,1), (2,2), (2,3), and (2,4), and LDEV7 is mapped to physical disks (3,0), (3,1), (3,2), (3,3), and (3,4). Physical disks (2,5) and (3,5), as shown in FIG. 21, are hot spares.

The foregoing addition of a hard disk drive to the configuration shown in FIG. 21 occurs in the present invention consistent with the above-mentioned description of disk drives connected to ports on a one-to-one basis.

According to the present invention, a logical device is defined in a physical disk for each desired storage area. Hence, if a hard disk drive having a capacity different from the capacities of drives of the existing disk array device is newly connected, it is possible to operate a logical device formed by the hard disk drives which are physically different from each other. Thus, the degree of freedom in selecting hard disk drives can be drastically improved.

Also according to the present invention, a logical device to be defined is selected taking into consideration the types of hard disk drives connected to control devices. Hence, the optimal logical device can be defined based on the capacities of the hard disk drives connected to the control device, so that the hard disk drives of the different types can be efficiently utilized.

In the present invention, if a predetermined logical device is a logical device which can be continuously striped, a newly connected hard disk drive can be striped so as to continue to the above logical device. Hence, the newly connected drive can be added without changing the data stored in the predetermined logical device and the capacity of the predetermined logical device can be increased.

Further in the present invention, a logical device can be selected taking into account how data should be handled. Hence, the present invention selects a logical device suitable for data to be handled and efficiently perform data processing.

Also in the present invention, a plurality of logical devices are defined over a plurality of physical disks and hence process various types of data efficiently.

In accordance with the present invention, a plurality of physical disks are divided into logical blocks, and a logical device can be defined for each of the divided logical blocks. Hence, the present invention improves the degree of freedom in defining the logical blocks.

The present invention is not limited to the embodiments, described above, but also encompasses variations thereof. A wide range of different working modes can be formed based on the present invention without deviating from the spirit and scope of the present invention. The present invention, therefore, is not restricted by its specific working modes except being limited by the appended charges.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| PARTS LIST: | |
| --- | --- |
| 1-1 through 1-n, and 12-1–12 - N | hard disk drives |
| 2 | control device |
| 4 | logical device |
| 5 | logical device setting unit |
| 6 | upper device (host computer) |
| 11 | Disk Array Device |
| 13 | host computer |
| 14 | control device (present invention) |
| 14' | another control device |
| 15 | cache memory |
| 16 | control circuit |
| 17 | coupling circuit |
| 19 | host adapter |
| P0–Pn | Ports |
| D1–DN | physical disks |
| S1–SM | storage areas |
| L1–LL | logical devices |
| DA0–DAn (200–20n) | device adapters |

What is claimed is:

1. A disk array device in which logical devices are formed by physical disks on which data is stored, said disk array device comprising:

logical device setting means for dividing storage areas of the physical disks into logical blocks and for defining logical devices across the physical disks by using the logical blocks, said physical disks being of varying sizes; and control means, coupled to said logical device setting means and the physical disks, for operating the physical disks so that the logical devices operate separately from each other.

2. The disk array device as claimed in claim 1, wherein said logical device setting means comprises:

detecting means for identifying types of the physical disks; and means, coupled to said detecting means, for defining the logical devices based on the types of the physical disks.

3. The disk array device as claimed in claim 1, wherein said logical device setting means comprises means for performing striping to form a logical device having logical blocks subsequent to the logical blocks of one of the logical devices when a new physical disk is added to the disk array device.

4. The disk array device as claimed in claim 1, wherein said logical device setting means comprises mode setting means for setting operation modes in which the logical devices operate.

5. The disk array device as claimed in claim 1, wherein said logical device setting means defines a plurality of logical devices to the physical disks.

6. A method for building a disk array device in which logical devices are formed by physical disks on which data is stored, said method comprising:

dividing storage areas of the physical disks into logical blocks and defining logical devices across the physical disks by using the logical blocks, said physical disks being of varying sizes; and operating the physical disks so that the logical devices operate separately from each other.

7. The disk array device as claimed in claim 2, wherein said logical device setting means comprises means for performing striping to form a logical device having logical blocks subsequent to the logical blocks of one of the logical devices when a new physical disk is added to the disk array device.

8. The disk array device as claimed in claim 2, wherein said logical device setting means comprises mode setting means for setting operation modes in which the logical devices operate.

9. The disk array device as claimed in claim 3, wherein said logical device setting means comprises mode setting means for setting operation modes in which the logical devices operate.

10. The disk array device as claimed in claim 2, wherein said logical device setting means defines a plurality of logical devices to the physical disks.

11. The disk array device as claimed in claim 3, wherein said logical device setting means defines a plurality of logical devices to the physical disks.

12. The disk array device as claimed in claim 4, wherein said logical device setting means defines a plurality of logical devices to the physical disks.

13. The method as claimed in claim 6, further comprising the step of performing striping to form a logical device having logical blocks subsequent to the logical blocks of one of the logical devices when a new physical disk is added to the disk array device.

14. A disk array device in which logical devices are formed by physical disks on which data is stored, said disk array device comprising:

a logical device setting part dividing storage areas of the physical disks into logical blocks and for defining logical devices across the physical disks by using the logical blocks, said physical disks being of varying sizes; and a control device, coupled to said logical device setting part and the physical disks, for operating the physical disks so that the logical devices operate separately from each other.

15. A method for building a disk array device in which logical devices are formed by physical disks on which data is stored, said method comprising:

dividing storage areas of the physical disks into logical blocks and defining logical devices across the physical disks by using the logical blocks, said physical disks having different capacities; and operating the physical disks so that the logical devices operate separately from each other.

16. The method as claimed in claim 15, further comprising the step of performing striping to form a logical device having logical blocks subsequent to the logical blocks of one of the logical devices when a new physical disk is added to the disk array device.

17. An apparatus comprising:

a disk array device, said disk array device comprising:

physical disk drives having different storage capacities and comprising storage areas divided into logical blocks; and a control circuit coupled to the physical disk drives and mapping logical disks onto the physical disk drives using the logical blocks, said control circuit extending storage capacity of the disk array device by adding a new physical disk drive to the disk array device and maintaining the mapping of the logical disks onto the physical disk drives.

18. A disk array device comprising physical disks and logical disks mapped onto the physical disks and adding a new physical disk to the physical disks while maintaining the mapping of the logical disks, said physical disks having different storage capacities and comprising storage areas divided into logical blocks, said logical disks being mapped onto the physical disks using the logical blocks.

19. The apparatus according to claim 17, wherein the control device maps the logical disks using RAID levels.

20. The apparatus according to claim 19, wherein the control device maps a new logical disk onto the new physical disk drive using RAID levels.

21. A method of extending storage capacity of a disk array device, comprising the steps of:

adding a new physical disk drive to the disk array device;

mapping a new logical disk onto the new physical disk drive while maintaining mapping of current logical disks onto current physical disk drives, said physical disk drives having different storage capacities and comprising storage areas divided into logical blocks, said logical disks being mapped onto the physical disk drives using the logical blocks.

* * * * *

UNITED STATES PATENT AND TRADEMARK OFFICE
CERTIFICATE OF CORRECTION

PATENT NO.:     5,845,319
DATED      :     December 1, 1998
INVENTOR(S):    Keiichi YORIMITSU It is certified that error appears in the above-identified patent and that said Letters Patent is hereby corrected as shown below:

On the title page, [54], line 2, change "LOCAL" to --LOGICAL--.

Col. 1,          line 2, change "LOCAL" to --LOGICAL--.

Signed and Sealed this

Eleventh Day of May, 1999

*Attest:*

Q. TODD DICKINSON

*Attesting Officer*     Acting Commissioner of Patents and Trademarks